United States Patent
Kelly et al.

(10) Patent No.: US 10,403,324 B2
(45) Date of Patent: *Sep. 3, 2019

(54) CARD RECOGNITION SYSTEM, CARD HANDLING DEVICE, AND METHOD FOR TUNING A CARD HANDLING DEVICE

(71) Applicant: Bally Gaming, Inc., Las Vegas, NV (US)

(72) Inventors: James V. Kelly, Las Vegas, NV (US); Brian E. Miller, Las Vegas, NV (US); Vladislav Zvercov, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,114

(22) Filed: Jun. 7, 2017

(65) Prior Publication Data

US 2017/0270964 A1  Sep. 21, 2017

Related U.S. Application Data

(60) Continuation of application No. 14/670,165, filed on Mar. 26, 2015, now Pat. No. 9,679,603, which is a
(Continued)

(51) Int. Cl.
*A63F 1/12* (2006.01)
*G11B 25/04* (2006.01)
(Continued)

(52) U.S. Cl.
CPC .............. *G11B 25/04* (2013.01); *A63F 1/12* (2013.01); *A63F 1/18* (2013.01); *G06K 9/00442* (2013.01);
(Continued)

(58) Field of Classification Search
CPC ...................................... A63F 1/12; A63F 1/14
(Continued)

(56) References Cited

U.S. PATENT DOCUMENTS

| 130,281 A | 8/1872 | Coughlin |
|---|---|---|
| 205,030 A | 6/1878 | Ash |

(Continued)

FOREIGN PATENT DOCUMENTS

| AU | 2383667 A | 1/1969 |
|---|---|---|
| AU | 5025479 A1 | 3/1980 |

(Continued)

OTHER PUBLICATIONS

"TableScanner (TM) from ADVANSYS", Casino Inside Magazine, No. 30, pp. 34-36 (Dec. 2012) (4 pages).

(Continued)

*Primary Examiner* — John E Simms, Jr.
*Assistant Examiner* — Dolores Collins
(74) *Attorney, Agent, or Firm* — TraskBritt

(57) ABSTRACT

A card recognition system comprises an imaging device configured to capture a raw image of at least a portion of a card, and a processor operably coupled with the imaging device. The processor is configured to perform an image processing analysis of the raw image to identify measurements of at least one of a rank area around a rank of the card, and a suit area around a suit of the card, and automatically generate a calibration file based, at least in part, on the image processing analysis. A card handling device comprises a card infeed, a card output, and a card recognition system. A method for tuning a card handling device comprises capturing a plurality of images from a deck of cards, storing the images in memory, analyzing the plurality of images for card
(Continued)

identification information, and generating a calibration file including parameters associated with the card identification information.

20 Claims, 14 Drawing Sheets

Related U.S. Application Data division of application No. 13/631,658, filed on Sep. 28, 2012, now Pat. No. 9,378,766.

(51) Int. Cl.
| | | |
|---|---|---|
| *G06K 9/62* | (2006.01) | |
| *A63F 1/18* | (2006.01) | |
| *G06K 9/00* | (2006.01) | |
| *G06K 9/46* | (2006.01) | |
| *G06K 9/52* | (2006.01) | |
| *H04N 7/18* | (2006.01) | |
| *A63F 9/24* | (2006.01) | |
| *G06K 9/36* | (2006.01) | |

(52) U.S. Cl.
CPC .............. *G06K 9/46* (2013.01); *G06K 9/52* (2013.01); *G06K 9/6201* (2013.01); *G06K 9/6202* (2013.01); *H04N 7/18* (2013.01); *A63F 2009/2425* (2013.01); *G06K 2009/363* (2013.01); *G06K 2009/4666* (2013.01); *G11B 2220/17* (2013.01)

(58) Field of Classification Search
USPC ...................................................... 273/149 R
See application file for complete search history.

(56) References Cited

U.S. PATENT DOCUMENTS

| | | | |
|---|---|---|---|
| 609,730 A | 8/1898 | Booth | |
| 673,154 A | 4/1901 | Bellows | |
| 793,489 A | 6/1905 | Williams | |
| 892,389 A | 7/1908 | Bellows | |
| 1,014,219 A | 1/1912 | Hall | |
| 1,043,109 A | 11/1912 | Hurm | |
| 1,157,898 A | 10/1915 | Perret | |
| 1,256,509 A | 2/1918 | Belknap | |
| 1,380,898 A | 6/1921 | Hall | |
| 1,992,085 A | 2/1925 | McKay | |
| 1,556,856 A | 10/1925 | Lipps | |
| 1,850,114 A | 6/1929 | McCaddin | |
| 1,757,553 A | 5/1930 | Gustav | |
| 1,885,276 A | 11/1932 | McKay | |
| 1,889,729 A | 11/1932 | Hammond | |
| 1,955,926 A | 4/1934 | Matthaey | |
| 1,998,690 A | 4/1935 | Shepherd et al. | |
| 2,001,220 A | 5/1935 | Smith | |
| 2,001,918 A | 5/1935 | Nevius | |
| 2,016,030 A | 10/1935 | Woodruff et al. | |
| 2,043,343 A | 6/1936 | Warner | |
| 2,060,096 A | 11/1936 | McCoy | |
| 2,065,824 A | 12/1936 | Plass | |
| 2,159,958 A | 5/1939 | Sachs | |
| 2,185,474 A | 1/1940 | Mott | |
| 2,254,484 A | 9/1941 | Hutchins | |
| D132,360 S | 5/1942 | Gardner | |
| 2,328,153 A | 8/1943 | Laing | |
| 2,328,879 A | 9/1943 | Isaacson | |
| D139,530 S | 11/1944 | Schindler | |
| 2,364,413 A | 12/1944 | Wittel | |
| 2,525,305 A | 10/1950 | Lombard | |
| 2,543,522 A | 2/1951 | Cohen | |
| 2,588,582 A | 3/1952 | Sivertson | |
| 2,615,719 A | 10/1952 | Fonken | |
| 2,659,607 A | 11/1953 | Skillman et al. | |
| 2,661,215 A | 12/1953 | Stevens | |
| 2,676,020 A | 4/1954 | Ogden | |
| 2,692,777 A | 10/1954 | Miller | |
| 2,701,720 A | 2/1955 | Ogden | |
| 2,705,638 A | 4/1955 | Newcomb | |
| 2,711,319 A | 6/1955 | Morgan et al. | |
| 2,714,510 A | 8/1955 | Oppenlander et al. | |
| 2,717,782 A | 9/1955 | Droll | |
| 2,727,747 A | 12/1955 | Semisch, Jr. | |
| 2,731,271 A | 1/1956 | Brown | |
| 2,747,877 A | 5/1956 | Howard | |
| 2,755,090 A | 7/1956 | Aldrich | |
| 2,757,005 A | 7/1956 | Nothaft | |
| 2,760,779 A | 8/1956 | Ogden et al. | |
| 2,770,459 A | 11/1956 | Wilson et al. | |
| 2,778,643 A | 1/1957 | Williams | |
| 2,778,644 A | 1/1957 | Stephenson | |
| 2,782,040 A | 2/1957 | Matter | |
| 2,790,641 A | 4/1957 | Adams | |
| 2,793,863 A | 5/1957 | Liebelt | |
| 2,815,214 A | 12/1957 | Hall | |
| 2,821,399 A | 1/1958 | Heinoo | |
| 2,914,215 A | 11/1959 | Neidig | |
| 2,937,739 A | 5/1960 | Levy | |
| 2,950,005 A | 8/1960 | MacDonald | |
| RE24,986 E | 5/1961 | Stephenson | |
| 3,067,885 A | 12/1962 | Kohler | |
| 3,107,096 A | 10/1963 | Osborn | |
| 3,124,674 A | 3/1964 | Edwards et al. | |
| 3,131,935 A | 5/1964 | Gronneberg | |
| 3,147,978 A | 9/1964 | Sjostrand | |
| D200,652 S | 3/1965 | Fisk | |
| 3,222,071 A | 12/1965 | Lang | |
| 3,235,741 A | 2/1966 | Plaisance | |
| 3,288,308 A | 11/1966 | Gingher | |
| 3,305,237 A | 2/1967 | Granius | |
| 3,312,473 A | 4/1967 | Friedman et al. | |
| 3,452,509 A | 7/1969 | Hauer | |
| 3,530,968 A | 9/1970 | Palmer | |
| 3,588,116 A | 6/1971 | Miura | |
| 3,589,730 A | 6/1971 | Slay | |
| 3,595,388 A | 7/1971 | Castaldi | |
| 3,597,076 A | 8/1971 | Hubbard et al. | |
| 3,598,396 A * | 8/1971 | Andrews ................ G06K 13/08 271/111 |
| 3,618,933 A | 11/1971 | Roggenstein et al. | |
| 3,627,331 A | 12/1971 | Lyon, Jr. | |
| 3,666,270 A | 5/1972 | Mazur | |
| 3,680,853 A | 8/1972 | Houghton et al. | |
| 3,690,670 A | 9/1972 | Cassady et al. | |
| 3,704,938 A | 12/1972 | Fanselow | |
| 3,716,238 A | 2/1973 | Porter | |
| 3,751,041 A | 8/1973 | Seifert | |
| 3,761,079 A | 9/1973 | Azure, Jr. | |
| 3,810,627 A | 5/1974 | Levy | |
| D232,953 S | 9/1974 | Oguchi | |
| 3,861,261 A | 1/1975 | Maxey | |
| 3,897,954 A | 8/1975 | Erickson et al. | |
| 3,899,178 A | 8/1975 | Watanabe | |
| 3,909,002 A | 9/1975 | Levy | |
| 3,929,339 A | 12/1975 | Mattioli | |
| 3,944,077 A | 3/1976 | Green | |
| 3,944,230 A | 3/1976 | Fineman | |
| 3,949,219 A | 4/1976 | Crouse | |
| 3,968,364 A | 7/1976 | Miller | |
| 4,023,705 A | 5/1977 | Reiner et al. | |
| 4,033,590 A | 7/1977 | Pic | |
| 4,072,930 A | 2/1978 | Lucero et al. | |
| 4,088,265 A | 5/1978 | Garczynski | |
| 4,151,410 A | 4/1979 | McMillan et al. | |
| 4,159,581 A | 7/1979 | Lichtenberg | |
| 4,162,649 A | 7/1979 | Thornton | |
| 4,166,615 A | 9/1979 | Noguchi et al. | |
| 4,232,861 A | 11/1980 | Maul | |
| 4,280,690 A | 7/1981 | Hill | |
| 4,283,709 A | 8/1981 | Lucero et al. | |
| 4,310,160 A | 1/1982 | Willette et al. | |
| 4,339,134 A | 7/1982 | Macheel | |
| 4,339,798 A | 7/1982 | Hedges et al. | |

(56) References Cited

U.S. PATENT DOCUMENTS

| | | |
|---|---|---|
| 4,361,393 A | 11/1982 | Nato |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda et al. |
| 4,397,469 A | 8/1983 | Carter, III |
| 4,421,312 A | 12/1983 | Delgado et al. |
| 4,421,501 A | 12/1983 | Scheffer |
| D273,962 S | 5/1984 | Fromm |
| D274,069 S | 5/1984 | Fromm |
| 4,467,424 A | 8/1984 | Hedges et al. |
| 4,494,197 A | 1/1985 | Troy et al. |
| 4,497,488 A | 2/1985 | Plevyak et al. |
| 4,512,580 A | 4/1985 | Matviak |
| 4,513,969 A | 4/1985 | Samsel, Jr. |
| 4,515,367 A | 5/1985 | Howard |
| 4,531,187 A | 7/1985 | Uhland |
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak et al. |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |
| 4,926,327 A | 5/1990 | Sidley |
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng |
| 5,000,453 A | 3/1991 | Stevens et al. |
| 5,004,218 A | 4/1991 | Sardano et al. |
| 5,039,102 A | 8/1991 | Miller |
| 5,067,713 A | 11/1991 | Soules |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci |
| 5,121,192 A | 6/1992 | Kazui |
| 5,121,921 A | 6/1992 | Friedman et al. |
| 5,146,346 A | 9/1992 | Knoll |
| 5,154,429 A | 10/1992 | LeVasseur |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba |
| 5,224,712 A | 7/1993 | Laughlin et al. |
| 5,240,140 A | 8/1993 | Huen |
| 5,248,142 A | 9/1993 | Breeding |
| 5,257,179 A | 10/1993 | DeMar |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy |
| 5,283,422 A | 2/1994 | Storch et al. |
| 5,288,081 A | 2/1994 | Breeding |
| 5,299,089 A | 3/1994 | Lwee |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller |
| 5,374,061 A | 12/1994 | Albrecht |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias |
| 5,416,308 A | 5/1995 | Hood et al. |
| 5,431,399 A | 7/1995 | Kelley |
| 5,431,407 A | 7/1995 | Hofberg et al. |
| 5,437,462 A | 8/1995 | Breeding |
| 5,445,377 A | 8/1995 | Steinbach |
| 5,470,079 A | 11/1995 | LeStrange et al. |
| D365,853 S | 1/1996 | Zadro |
| 5,489,101 A | 2/1996 | Moody |
| 5,515,477 A | 5/1996 | Sutherland |
| 5,524,888 A | 6/1996 | Heidel |
| 5,531,448 A | 7/1996 | Moody |
| 5,544,892 A | 8/1996 | Breeding |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea, Jr. |
| 5,613,912 A | 3/1997 | Slater |
| 5,632,483 A | 5/1997 | Garczynski et al. |
| 5,636,843 A | 6/1997 | Roberts |
| 5,651,548 A | 7/1997 | French et al. |
| 5,655,961 A | 8/1997 | Acres et al. |
| 5,655,966 A | 8/1997 | Werdin, Jr. et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller |
| 5,683,085 A | 11/1997 | Johnson et al. |
| 5,685,543 A | 11/1997 | Garner |
| 5,690,324 A | 11/1997 | Otomo et al. |
| 5,692,748 A | 12/1997 | Frisco et al. |
| 5,695,189 A | 12/1997 | Breeding et al. |
| 5,701,565 A | 12/1997 | Morgan |
| 5,707,286 A | 1/1998 | Carlson |
| 5,707,287 A | 1/1998 | McCrea, Jr. |
| 5,711,525 A | 1/1998 | Breeding |
| 5,718,427 A | 2/1998 | Cranford et al. |
| 5,719,288 A | 2/1998 | Sens et al. |
| 5,720,484 A | 2/1998 | Hsu |
| 5,722,893 A | 3/1998 | Hill et al. |
| 5,735,525 A | 4/1998 | McCrea, Jr. |
| 5,735,724 A | 4/1998 | Udagawa |
| 5,735,742 A | 4/1998 | French |
| 5,743,798 A | 4/1998 | Adams et al. |
| 5,768,382 A | 6/1998 | Schneier et al. |
| 5,770,533 A | 6/1998 | Franchi |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | van Putten et al. |
| 5,788,574 A | 8/1998 | Ornstein et al. |
| 5,791,988 A | 8/1998 | Nomi |
| 5,802,560 A | 9/1998 | Joseph et al. |
| 5,803,808 A * | 9/1998 | Strisower .................. A63F 1/18 273/309 |
| 5,810,355 A | 9/1998 | Trilli |
| 5,813,326 A | 9/1998 | Salomon |
| 5,813,912 A | 9/1998 | Shultz |
| 5,814,796 A | 9/1998 | Benson |
| 5,836,775 A | 11/1998 | Hiyama et al. |
| 5,839,730 A | 11/1998 | Pike |
| 5,845,906 A | 12/1998 | Wirth |
| 5,851,011 A | 12/1998 | Lott |
| 5,867,586 A | 2/1999 | Liang |

(56) References Cited

U.S. PATENT DOCUMENTS

| | | |
|---|---|---|
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,909,876 A | 6/1999 | Brown |
| 5,911,626 A | 6/1999 | McCrea, Jr. |
| 5,919,090 A | 7/1999 | Mothwurf |
| D412,723 S | 8/1999 | Hachuel et al. |
| 5,936,222 A | 8/1999 | Korsunsky |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne |
| 5,974,150 A | 10/1999 | Kaish et al. |
| 5,989,122 A | 11/1999 | Roblejo |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding |
| 6,039,650 A | 3/2000 | Hill |
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea, Jr. |
| 6,113,101 A | 9/2000 | Wirth |
| 6,117,012 A | 9/2000 | McCrea, Jr. |
| D432,588 S | 10/2000 | Tedham |
| 6,126,166 A * | 10/2000 | Lorson .................. A63F 1/14 273/148 A |
| 6,131,817 A | 10/2000 | Miller |
| 6,139,014 A | 10/2000 | Breeding et al. |
| 6,149,154 A | 11/2000 | Grauzer et al. |
| 6,154,131 A | 11/2000 | Jones, II et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |
| 6,196,416 B1 | 3/2001 | Seagle |
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines et al. |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block |
| 6,386,973 B1 | 5/2002 | Yoseloff |
| 6,402,142 B1 | 6/2002 | Warren et al. |
| 6,403,908 B2 | 6/2002 | Stardust et al. |
| 6,443,839 B2 | 9/2002 | Stockdale et al. |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Starch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B2 | 7/2003 | Hard |
| 6,585,856 B2 | 7/2003 | Zwick et al. |
| 6,588,750 B1 | 7/2003 | Grauzer et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson et al. |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B1 | 10/2003 | Purton |
| 6,637,622 B1 | 10/2003 | Robinson |
| 6,638,161 B2 | 10/2003 | Soltys et al. |
| 6,645,068 B1 | 11/2003 | Kelly et al. |
| 6,645,077 B2 | 11/2003 | Rowe |
| 6,651,981 B2 | 11/2003 | Grauzer et al. |
| 6,651,982 B2 | 11/2003 | Grauzer et al. |
| 6,651,985 B2 | 11/2003 | Sines et al. |
| 6,652,379 B2 | 11/2003 | Soltys et al. |
| 6,655,684 B2 | 12/2003 | Grauzer et al. |
| 6,655,690 B1 | 12/2003 | Oskwarek |
| 6,658,135 B1 | 12/2003 | Morito et al. |
| 6,659,460 B2 | 12/2003 | Blaha et al. |
| 6,659,461 B2 | 12/2003 | Yoseloff |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,127 B2 | 1/2004 | Johnson et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,712,696 B2 | 3/2004 | Soltys et al. |
| 6,719,288 B2 | 4/2004 | Hessing et al. |
| 6,719,634 B2 | 4/2004 | Mishina et al. |
| 6,722,974 B2 | 4/2004 | Sines et al. |
| 6,726,205 B1 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |

(56) References Cited

U.S. PATENT DOCUMENTS

| | | |
|---|---|---|
| 6,749,510 B2 | 6/2004 | Giobbi |
| 6,758,751 B2 | 7/2004 | Soltys et al. |
| 6,758,757 B2 | 7/2004 | Luciano, Jr. et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow et al. |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue, Jr. et al. |
| 6,848,994 B1 | 2/2005 | Knust et al. |
| 6,857,961 B2 | 2/2005 | Soltys et al. |
| 6,874,784 B1 | 4/2005 | Promutico et al. |
| 6,874,786 B2 | 4/2005 | Bruno |
| 6,877,657 B2 | 4/2005 | Ranard et al. |
| 6,877,748 B1 | 4/2005 | Patroni et al. |
| 6,886,829 B2 | 5/2005 | Hessing et al. |
| 6,889,979 B2 | 5/2005 | Blaha et al. |
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fisher et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes |
| 7,011,309 B2 | 3/2006 | Soltys et al. |
| 7,020,307 B2 | 3/2006 | Hinton et al. |
| 7,028,598 B2 | 4/2006 | Teshima |
| 7,029,009 B2 | 4/2006 | Grauzer et al. |
| 7,036,818 B2 | 5/2006 | Grauzer et al. |
| 7,046,458 B2 | 5/2006 | Nakayama |
| 7,046,764 B1 | 5/2006 | Kump |
| 7,048,629 B2 | 5/2006 | Sines et al. |
| 7,059,602 B2 | 6/2006 | Grauzer et al. |
| 7,066,464 B2 | 6/2006 | Blad et al. |
| 7,068,822 B2 | 6/2006 | Scott |
| 7,073,791 B2 | 7/2006 | Grauzer et al. |
| 7,079,010 B2 | 7/2006 | Champlin |
| 7,084,769 B2 | 8/2006 | Bauer et al. |
| 7,089,420 B1 | 8/2006 | Durst et al. |
| D527,900 S | 9/2006 | Dewa |
| 7,106,201 B2 | 9/2006 | Tuttle |
| 7,113,094 B2 | 9/2006 | Garber et al. |
| 7,114,718 B2 | 10/2006 | Grauzer et al. |
| 7,124,947 B2 | 10/2006 | Storch |
| 7,128,652 B1 | 10/2006 | Lavoie et al. |
| 7,137,627 B2 | 11/2006 | Grauzer et al. |
| 7,139,108 B2 | 11/2006 | Andersen et al. |
| 7,140,614 B2 | 11/2006 | Snow |
| 7,162,035 B1 | 1/2007 | Durst et al. |
| 7,165,769 B2 | 1/2007 | Crenshaw et al. |
| 7,165,770 B2 | 1/2007 | Snow |
| 7,175,522 B2 | 2/2007 | Hartl |
| 7,186,181 B2 | 3/2007 | Rowe |
| 7,201,656 B2 | 4/2007 | Darder |
| 7,202,888 B2 | 4/2007 | Tecu et al. |
| 7,203,841 B2 | 4/2007 | Jackson et al. |
| 7,213,812 B2 | 5/2007 | Schubert |
| 7,222,852 B2 | 5/2007 | Soltys |
| 7,222,855 B2 | 5/2007 | Sorge |
| 7,231,812 B1 | 6/2007 | Lagare |
| 7,234,698 B2 | 6/2007 | Grauzer et al. |
| 7,237,969 B2 | 7/2007 | Bartman |
| 7,243,148 B2 | 7/2007 | Keir et al. |
| 7,243,698 B2 | 7/2007 | Siegel |
| 7,246,799 B2 | 7/2007 | Snow |
| 7,255,344 B2 | 8/2007 | Grauzer et al. |
| 7,255,351 B2 | 8/2007 | Yoseloff et al. |
| 7,255,642 B2 | 8/2007 | Sines et al. |
| 7,257,630 B2 | 8/2007 | Cole et al. |
| 7,261,294 B2 | 8/2007 | Grauzer et al. |
| 7,264,241 B2 | 9/2007 | Schubert et al. |
| 7,264,243 B2 | 9/2007 | Yoseloff et al. |
| 7,277,570 B2 | 10/2007 | Armstrong |
| 7,278,923 B2 | 10/2007 | Grauzer et al. |
| 7,294,056 B2 | 11/2007 | Lowell et al. |
| 7,297,062 B2 | 11/2007 | Gatto et al. |
| 7,300,056 B2 | 11/2007 | Gioia et al. |
| 7,303,473 B2 | 12/2007 | Rowe |
| 7,303,475 B2 | 12/2007 | Britt et al. |
| 7,309,065 B2 | 12/2007 | Yoseloff et al. |
| 7,316,609 B2 | 1/2008 | Dunn et al. |
| 7,316,615 B2 | 1/2008 | Soltys et al. |
| 7,322,576 B2 | 1/2008 | Grauzer et al. |
| 7,331,579 B2 | 2/2008 | Snow |
| 7,334,794 B2 | 2/2008 | Snow |
| 7,338,044 B2 | 3/2008 | Grauzer et al. |
| 7,338,362 B1 | 3/2008 | Gallagher |
| 7,341,510 B2 | 3/2008 | Bourbour et al. |
| D566,784 S | 4/2008 | Palmer |
| 7,357,321 B2 | 4/2008 | Yoshida |
| 7,360,094 B2 | 4/2008 | Neff |
| 7,367,561 B2 | 5/2008 | Blaha et al. |
| 7,367,563 B2 | 5/2008 | Yoseloff et al. |
| 7,367,565 B2 | 5/2008 | Chiu |
| 7,367,884 B2 | 5/2008 | Breeding et al. |
| 7,374,170 B2 | 5/2008 | Grauzer et al. |
| 7,384,044 B2 | 6/2008 | Grauzer et al. |
| 7,387,300 B2 | 6/2008 | Snow |
| 7,389,990 B2 | 6/2008 | Mourad |
| 7,390,256 B2 | 6/2008 | Soltys et al. |
| 7,399,226 B2 | 7/2008 | Mishra |
| 7,407,438 B2 | 8/2008 | Schubert et al. |
| 7,413,191 B2 | 8/2008 | Grauzer et al. |
| 7,434,805 B2 | 10/2008 | Grauzer et al. |
| 7,436,957 B1 | 10/2008 | Fisher et al. |
| 7,448,626 B2 | 11/2008 | Fleckenstein |
| 7,458,582 B2 | 12/2008 | Snow et al. |
| 7,461,843 B1 | 12/2008 | Baker et al. |
| 7,464,932 B2 | 12/2008 | Darling |
| 7,464,934 B2 | 12/2008 | Schwartz |
| 7,472,906 B2 | 1/2009 | Shai |
| 7,478,813 B1 | 1/2009 | Hofferber et al. |
| 7,500,672 B2 | 3/2009 | Ho |
| 7,506,874 B2 | 3/2009 | Hall |
| 7,510,186 B2 | 3/2009 | Fleckenstein |
| 7,510,190 B2 | 3/2009 | Snow et al. |
| 7,510,194 B2 | 3/2009 | Soltys et al. |
| 7,510,478 B2 | 3/2009 | Benbrahim et al. |
| 7,513,437 B2 | 4/2009 | Douglas |
| 7,515,718 B2 | 4/2009 | Nguyen et al. |
| 7,523,935 B2 | 4/2009 | Grauzer et al. |
| 7,523,936 B2 | 4/2009 | Grauzer et al. |
| 7,523,937 B2 | 4/2009 | Fleckenstein |
| 7,525,510 B2 | 4/2009 | Beland et al. |
| 7,537,216 B2 | 5/2009 | Soltys et al. |
| 7,540,497 B2 | 6/2009 | Tseng |
| 7,540,498 B2 | 6/2009 | Crenshaw et al. |
| 7,549,643 B2 | 6/2009 | Quach |
| 7,554,753 B2 | 6/2009 | Wakamiya |
| 7,556,197 B2 | 7/2009 | Yoshida |
| 7,556,266 B2 | 7/2009 | Blaha et al. |
| 7,575,237 B2 | 8/2009 | Snow |
| 7,578,506 B2 | 8/2009 | Lambert |
| 7,584,962 B2 | 9/2009 | Breeding et al. |
| 7,584,963 B2 | 9/2009 | Krenn et al. |
| 7,584,966 B2 | 9/2009 | Snow |
| 7,591,728 B2 | 9/2009 | Gioia et al. |
| 7,593,544 B2 | 9/2009 | Downs |
| 7,594,660 B2 | 9/2009 | Baker et al. |

(56) References Cited

U.S. PATENT DOCUMENTS

| | | | |
|---|---|---|---|
| 7,597,623 B2 | 10/2009 | Grauzer et al. | |
| 7,644,923 B1 | 1/2010 | Dickinson et al. | |
| 7,661,676 B2 | 2/2010 | Smith et al. | |
| 7,666,090 B2 | 2/2010 | Hettinger | |
| 7,669,852 B2 | 3/2010 | Baker et al. | |
| 7,669,853 B2 | 3/2010 | Jones | |
| 7,677,565 B2 | 3/2010 | Grauzer et al. | |
| 7,677,566 B2 | 3/2010 | Krenn et al. | |
| 7,686,681 B2 | 3/2010 | Soltys et al. | |
| 7,699,694 B2 | 4/2010 | Hill | |
| 7,735,657 B2 | 6/2010 | Johnson | |
| 7,740,244 B2 | 6/2010 | Ho | |
| 7,744,452 B2 | 6/2010 | Cimring et al. | |
| 7,753,373 B2 | 7/2010 | Grauzer et al. | |
| 7,753,374 B2 | 7/2010 | Ho | |
| 7,753,798 B2 | 7/2010 | Soltys | |
| 7,758,425 B2 | 7/2010 | Poh et al. | |
| 7,762,554 B2 | 7/2010 | Ho | |
| 7,764,836 B2 | 7/2010 | Downs et al. | |
| 7,766,332 B2 * | 8/2010 | Grauzer | A63F 1/14 273/149 R |
| 7,766,333 B1 | 8/2010 | Stardust | |
| 7,769,232 B2 | 8/2010 | Downs, III | |
| 7,769,853 B2 | 8/2010 | Nezamzadeh | |
| 7,773,749 B1 | 8/2010 | Durst et al. | |
| 7,780,529 B2 | 8/2010 | Rowe et al. | |
| 7,784,790 B2 | 8/2010 | Grauzer et al. | |
| 7,804,982 B2 | 9/2010 | Howard et al. | |
| 7,824,255 B2 | 11/2010 | Lutnick | |
| 7,846,020 B2 | 12/2010 | Walker et al. | |
| 7,867,080 B2 | 1/2011 | Nicely et al. | |
| 7,890,365 B2 | 2/2011 | Hettinger | |
| 7,900,923 B2 | 3/2011 | Toyama et al. | |
| 7,901,285 B2 | 3/2011 | Tran et al. | |
| 7,908,169 B2 | 3/2011 | Hettinger | |
| 7,909,689 B2 | 3/2011 | Lardie | |
| 7,931,533 B2 | 4/2011 | LeMay et al. | |
| 7,933,448 B2 | 4/2011 | Downs, III | |
| 7,946,586 B2 * | 5/2011 | Krenn | A63F 1/14 273/149 R |
| 7,967,294 B2 | 6/2011 | Blaha et al. | |
| 7,976,023 B1 | 7/2011 | Hessing et al. | |
| 7,988,152 B2 | 8/2011 | Sines et al. | |
| 7,988,554 B2 | 8/2011 | LeMay et al. | |
| 7,995,196 B1 | 8/2011 | Fraser | |
| 8,002,638 B2 | 8/2011 | Grauzer et al. | |
| 8,011,661 B2 | 9/2011 | Stasson | |
| 8,016,663 B2 | 9/2011 | Soltys et al. | |
| 8,021,231 B2 | 9/2011 | Walker et al. | |
| 8,025,294 B2 | 9/2011 | Grauzer et al. | |
| 8,038,521 B2 | 10/2011 | Grauzer et al. | |
| RE42,944 E | 11/2011 | Blaha et al. | |
| 8,057,302 B2 | 11/2011 | Wells et al. | |
| 8,062,134 B2 | 11/2011 | Kelly et al. | |
| 8,070,574 B2 * | 12/2011 | Grauzer | A63F 1/12 463/11 |
| 8,092,307 B2 | 1/2012 | Kelly | |
| 8,092,309 B2 | 1/2012 | Bickley | |
| 8,109,514 B2 | 2/2012 | Toyama | |
| 8,141,875 B2 | 3/2012 | Grauzer et al. | |
| 8,150,158 B2 | 4/2012 | Downs, III | |
| 8,171,567 B1 | 5/2012 | Fraser et al. | |
| 8,210,536 B2 | 7/2012 | Blaha et al. | |
| 8,221,244 B2 | 7/2012 | French | |
| 8,251,293 B2 | 8/2012 | Nagata et al. | |
| 8,267,404 B2 | 9/2012 | Grauzer et al. | |
| 8,270,603 B1 | 9/2012 | Durst et al. | |
| 8,287,347 B2 | 10/2012 | Snow et al. | |
| 8,287,386 B2 | 10/2012 | Miller et al. | |
| 8,319,666 B2 | 11/2012 | Weinmann et al. | |
| 8,337,296 B2 | 12/2012 | Grauzer et al. | |
| 8,342,525 B2 | 1/2013 | Scheper et al. | |
| 8,342,526 B1 | 1/2013 | Sampson | |
| 8,342,529 B2 | 1/2013 | Snow | |
| 8,353,513 B2 | 1/2013 | Swanson | |
| 8,381,918 B2 | 2/2013 | Johnson | |
| 8,419,521 B2 | 4/2013 | Grauzer et al. | |
| 8,429,229 B2 | 4/2013 | Sepich et al. | |
| 8,444,147 B2 | 5/2013 | Grauzer et al. | |
| 8,444,489 B2 | 5/2013 | Lian et al. | |
| 8,469,360 B2 | 6/2013 | Sines | |
| 8,475,252 B2 | 7/2013 | Savage et al. | |
| 8,480,088 B2 | 7/2013 | Toyama et al. | |
| 8,485,527 B2 | 7/2013 | Sampson et al. | |
| 8,490,973 B2 | 7/2013 | Yoseloff et al. | |
| 8,498,444 B2 | 7/2013 | Sharma | |
| 8,505,916 B2 | 8/2013 | Grauzer et al. | |
| 8,511,684 B2 | 8/2013 | Grauzer et al. | |
| 8,512,146 B2 | 8/2013 | Gururajan et al. | |
| 8,550,464 B2 | 10/2013 | Soltys et al. | |
| 8,556,263 B2 | 10/2013 | Grauzer et al. | |
| 8,579,289 B2 | 11/2013 | Rynda et al. | |
| 8,602,416 B2 | 12/2013 | Toyama | |
| 8,616,552 B2 * | 12/2013 | Czyzewski | A63F 1/12 273/149 R |
| 8,628,086 B2 | 1/2014 | Krenn et al. | |
| 8,651,485 B2 | 2/2014 | Stasson | |
| 8,662,500 B2 | 3/2014 | Swanson | |
| 8,695,978 B1 | 4/2014 | Ho | |
| 8,702,100 B2 | 4/2014 | Snow et al. | |
| 8,702,101 B2 | 4/2014 | Scheper et al. | |
| 8,720,891 B2 | 5/2014 | Hessing et al. | |
| 8,758,111 B2 | 6/2014 | Lutnick | |
| 8,777,710 B2 | 7/2014 | Grauzer et al. | |
| 8,820,745 B2 | 9/2014 | Grauzer et al. | |
| 8,844,930 B2 | 9/2014 | Sampson | |
| 8,899,587 B2 | 12/2014 | Grauzer et al. | |
| 8,919,775 B2 | 12/2014 | Wadds et al. | |
| 9,101,821 B2 | 8/2015 | Snow | |
| 9,251,661 B2 | 2/2016 | Tammesoo | |
| 9,266,012 B2 | 2/2016 | Grauzer | |
| 9,280,866 B2 | 3/2016 | Nayak et al. | |
| 9,378,766 B2 * | 6/2016 | Kelly | A63F 1/18 |
| 9,474,957 B2 | 10/2016 | Haushalter et al. | |
| 9,504,905 B2 | 11/2016 | Kelly et al. | |
| 9,511,274 B2 | 12/2016 | Kelly et al. | |
| 9,566,501 B2 | 2/2017 | Stasson et al. | |
| 9,679,603 B2 * | 6/2017 | Kelly | A63F 1/18 |
| 9,731,190 B2 | 8/2017 | Sampson et al. | |
| 2001/0036231 A1 | 11/2001 | Easwar et al. | |
| 2001/0036866 A1 | 11/2001 | Stockdale et al. | |
| 2001/0054576 A1 | 12/2001 | Stardust et al. | |
| 2002/0017481 A1 | 2/2002 | Johnson et al. | |
| 2002/0045478 A1 | 4/2002 | Soltys et al. | |
| 2002/0045481 A1 | 4/2002 | Soltys et al. | |
| 2002/0063389 A1 | 5/2002 | Breeding et al. | |
| 2002/0068635 A1 | 6/2002 | Hill | |
| 2002/0070499 A1 | 6/2002 | Breeding et al. | |
| 2002/0094869 A1 | 7/2002 | Harkham | |
| 2002/0107067 A1 | 8/2002 | McGlone et al. | |
| 2002/0107072 A1 | 8/2002 | Giobbi | |
| 2002/0113368 A1 | 8/2002 | Hessing et al. | |
| 2002/0135692 A1 | 9/2002 | Fujinawa | |
| 2002/0142820 A1 | 10/2002 | Bartlett | |
| 2002/0155869 A1 | 10/2002 | Soltys et al. | |
| 2002/0163122 A1 | 11/2002 | Vancura | |
| 2002/0163125 A1 | 11/2002 | Grauzer et al. | |
| 2002/0187821 A1 | 12/2002 | Soltys et al. | |
| 2002/0187830 A1 | 12/2002 | Stockdale et al. | |
| 2003/0003997 A1 | 1/2003 | Vuong et al. | |
| 2003/0007143 A1 | 1/2003 | McArthur et al. | |
| 2003/0042673 A1 | 3/2003 | Grauzer | |
| 2003/0047870 A1 | 3/2003 | Blaha et al. | |
| 2003/0048476 A1 | 3/2003 | Yamakawa | |
| 2003/0052449 A1 | 3/2003 | Grauzer et al. | |
| 2003/0052450 A1 | 3/2003 | Grauzer et al. | |
| 2003/0064798 A1 | 4/2003 | Grauzer et al. | |
| 2003/0067112 A1 | 4/2003 | Grauzer et al. | |
| 2003/0071413 A1 | 4/2003 | Blaha et al. | |
| 2003/0073498 A1 | 4/2003 | Grauzer et al. | |
| 2003/0075865 A1 | 4/2003 | Grauzer et al. | |
| 2003/0075866 A1 | 4/2003 | Blaha et al. | |
| 2003/0087694 A1 | 5/2003 | Storch | |
| 2003/0090059 A1 | 5/2003 | Grauzer et al. | |

(56) References Cited

U.S. PATENT DOCUMENTS

| | | |
|---|---|---|
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0036214 A1 | 2/2004 | Baker et al. |
| 2004/0067789 A1 | 4/2004 | Grauzer et al. |
| 2004/0100026 A1 | 5/2004 | Haggard |
| 2004/0108654 A1 | 6/2004 | Grauzer et al. |
| 2004/0116179 A1 | 6/2004 | Nicely et al. |
| 2004/0169332 A1 | 9/2004 | Grauzer et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0012818 A1 | 1/2005 | Kiely et al. |
| 2005/0023752 A1 | 2/2005 | Grauzer et al. |
| 2005/0026680 A1 | 2/2005 | Gururajan |
| 2005/0035548 A1 | 2/2005 | Yoseloff |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051956 A1 | 3/2005 | Grauzer et al. |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys |
| 2005/0121852 A1 | 6/2005 | Soltys et al. |
| 2005/0137005 A1 | 6/2005 | Soltys et al. |
| 2005/0140090 A1 | 6/2005 | Breeding et al. |
| 2005/0146093 A1 | 7/2005 | Grauzer et al. |
| 2005/0148391 A1 | 7/2005 | Tain |
| 2005/0164759 A1 | 7/2005 | Smith et al. |
| 2005/0164761 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs |
| 2005/0272501 A1 | 12/2005 | Tran et al. |
| 2005/0277463 A1 | 12/2005 | Knust et al. |
| 2005/0288083 A1 | 12/2005 | Downs |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0063577 A1 | 3/2006 | Downs, III et al. |
| 2006/0066048 A1 | 3/2006 | Krenn et al. |
| 2006/0084502 A1 | 4/2006 | Downs et al. |
| 2006/0151946 A1 | 7/2006 | Ngai |
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0279040 A1 | 12/2006 | Downs et al. |
| 2006/0281534 A1 | 12/2006 | Grauzer et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs, III |
| 2007/0045959 A1 | 3/2007 | Soltys |
| 2007/0049368 A1 | 3/2007 | Kuhn et al. |
| 2007/0057454 A1 | 3/2007 | Fleckenstein |
| 2007/0057469 A1 | 3/2007 | Grauzer et al. |
| 2007/0066387 A1 | 3/2007 | Matsuno et al. |
| 2007/0069462 A1 | 3/2007 | Downs, III et al. |
| 2007/0072677 A1 | 3/2007 | Lavoie et al. |
| 2007/0102879 A1 | 5/2007 | Stasson |
| 2007/0111773 A1 | 5/2007 | Gururajan et al. |
| 2007/0184905 A1 | 8/2007 | Gatto et al. |
| 2007/0197294 A1 | 8/2007 | Gong |
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0241498 A1 | 10/2007 | Soltys |
| 2007/0259709 A1 | 11/2007 | Kelly et al. |
| 2007/0267812 A1 | 11/2007 | Grauzer et al. |
| 2007/0272600 A1 | 11/2007 | Johnson |
| 2007/0278739 A1 | 12/2007 | Swanson |
| 2007/0287534 A1 | 12/2007 | Fleckenstein |
| 2007/0290438 A1 | 12/2007 | Grauzer et al. |
| 2007/0298865 A1 | 12/2007 | Soltys |
| 2008/0004107 A1 | 1/2008 | Nguyen et al. |
| 2008/0006997 A1 | 1/2008 | Scheper et al. |
| 2008/0006998 A1 | 1/2008 | Grauzer et al. |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0096656 A1 | 4/2008 | LeMay et al. |
| 2008/0111300 A1 | 5/2008 | Czyzewski et al. |
| 2008/0113700 A1 | 5/2008 | Czyzewski et al. |
| 2008/0113783 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0303210 A1 | 12/2008 | Grauzer et al. |
| 2008/0315517 A1 | 12/2008 | Toyama et al. |
| 2009/0026700 A2 | 1/2009 | Shigeta |
| 2009/0048026 A1 | 2/2009 | French |
| 2009/0054161 A1 | 2/2009 | Schuber et al. |
| 2009/0072477 A1 | 3/2009 | Tseng et al. |
| 2009/0121429 A1 | 3/2009 | Walsh et al. |
| 2009/0091078 A1 | 4/2009 | Grauzer et al. |
| 2009/0100409 A1 | 4/2009 | Toneguzzo |
| 2009/0104963 A1 | 4/2009 | Burman |
| 2009/0134575 A1 | 5/2009 | Dickinson et al. |
| 2009/0140492 A1 | 6/2009 | Yoseloff et al. |
| 2009/0166970 A1 | 7/2009 | Rosh et al. |
| 2009/0176547 A1 | 7/2009 | Katz |
| 2009/0179378 A1 | 7/2009 | Amaitis et al. |
| 2009/0186676 A1 | 7/2009 | Amaitis |
| 2009/0189346 A1 | 7/2009 | Krenn et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0224476 A1 | 9/2009 | Grauzer et al. |
| 2009/0227318 A1 | 9/2009 | Wright et al. |
| 2009/0227360 A1 | 9/2009 | Gioia et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267296 A1 | 10/2009 | Ho et al. |
| 2009/0267297 A1 | 10/2009 | Blaha et al. |
| 2009/0283969 A1 | 11/2009 | Tseng et al. |
| 2009/0298577 A1 | 12/2009 | Gagner et al. |
| 2009/0302535 A1 | 12/2009 | Ho et al. |
| 2009/0302537 A1 | 12/2009 | Ho et al. |
| 2009/0312093 A1 | 12/2009 | Walker et al. |
| 2009/0314188 A1 | 12/2009 | Toyama et al. |
| 2010/0013152 A1 | 1/2010 | Grauzer |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |

(56) References Cited

U.S. PATENT DOCUMENTS

| | | |
|---|---|---|
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer |
| 2011/0006480 A1* | 1/2011 | Grauzer .............. A63F 1/12 273/149 R |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta |
| 2011/0078096 A1 | 3/2011 | Bounds |
| 2011/0079959 A1 | 4/2011 | Hartley |
| 2011/0105208 A1 | 5/2011 | Bickley |
| 2011/0109042 A1 | 5/2011 | Rynda |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0272881 A1 | 11/2011 | Sines |
| 2011/0285081 A1 | 11/2011 | Stasson |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer |
| 2012/0181747 A1 | 7/2012 | Grauzer et al. |
| 2012/0187625 A1 | 7/2012 | Downs, III et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines |
| 2013/0023318 A1 | 1/2013 | Abrahamson |
| 2013/0085638 A1 | 4/2013 | Weinmann et al. |
| 2013/0099448 A1 | 4/2013 | Scheper et al. |
| 2013/0109455 A1 | 5/2013 | Grauzer et al. |
| 2013/0132306 A1 | 5/2013 | Kami et al. |
| 2013/0147116 A1 | 6/2013 | Stasson |
| 2013/0161905 A1 | 6/2013 | Grauzer et al. |
| 2013/0228972 A1 | 9/2013 | Grauzer et al. |
| 2013/0241147 A1 | 9/2013 | McGrath |
| 2013/0300059 A1 | 11/2013 | Sampson et al. |
| 2013/0337922 A1 | 12/2013 | Kuhn |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |
| 2015/0021242 A1 | 1/2015 | Johnson |
| 2015/0069699 A1 | 3/2015 | Blazevic |
| 2015/0196834 A1 | 7/2015 | Snow |
| 2015/0238848 A1 | 8/2015 | Kuhn et al. |
| 2017/0157499 A1 | 6/2017 | Krenn et al. |

FOREIGN PATENT DOCUMENTS

| | | |
|---|---|---|
| AU | 697805 B2 | 10/1998 |
| AU | 757636 B2 | 2/2003 |
| CA | 2266555 A1 | 9/1996 |
| CA | 2284017 A1 | 9/1998 |
| CA | 2612138 A1 | 12/2006 |
| CN | 2051521 U | 1/1990 |
| CN | 1824356 A | 8/2006 |
| CN | 2848303 Y | 12/2006 |
| CN | 2855481 Y | 1/2007 |
| CN | 1933881 A | 3/2007 |
| CN | 2877425 Y | 3/2007 |
| CN | 101025603 A | 8/2007 |
| CN | 200954370 Y | 10/2007 |
| CN | 200987893 Y | 12/2007 |
| CN | 101099896 A | 1/2008 |
| CN | 101127131 A | 2/2008 |
| CN | 101134141 A | 3/2008 |
| CN | 201085907 Y | 7/2008 |
| CN | 201139926 Y | 10/2008 |
| CN | 100571826 C | 12/2009 |
| CN | 1771077 B | 6/2010 |
| CN | 102125756 A | 7/2011 |
| CN | 102170944 A | 8/2011 |
| CN | 101783011 B | 12/2011 |
| CN | 102847311 A | 1/2013 |
| CN | 202724641 U | 2/2013 |
| CN | 202983149 U | 6/2013 |
| CZ | 24952 U1 | 2/2013 |
| DE | 2816377 A1 | 10/1979 |
| DE | 3807127 A1 | 9/1989 |
| DE | 2757341 A1 | 9/1998 |
| EP | 0777514 B1 | 2/2000 |
| EP | 1502631 A1 | 2/2005 |
| EP | 1713026 A1 | 10/2006 |
| EP | 1194888 A1 | 8/2009 |
| EP | 2228106 A1 | 9/2010 |
| EP | 1575261 B1 | 8/2012 |
| FR | 2375918 A1 | 7/1978 |
| GB | 289552 A | 4/1928 |
| GB | 337147 A | 9/1929 |
| GB | 414014 A | 7/1934 |
| GB | 672616 A | 5/1952 |
| JP | 10063933 A | 3/1998 |
| JP | 11045321 A | 2/1999 |
| JP | 2000251031 A | 9/2000 |
| JP | 2001327647 A | 11/2001 |
| JP | 2002165916 A | 6/2002 |
| JP | 2003-154320 A | 5/2003 |
| JP | 2003250950 A | 9/2003 |
| JP | 2005198668 A | 7/2005 |
| JP | 2008246061 A | 10/2008 |
| JP | 4586474 B2 | 11/2010 |
| TW | M335308 U | 7/2008 |
| TW | M359356 U | 6/2009 |
| TW | I345476 B | 7/2011 |
| WO | 8700764 A1 | 2/1987 |
| WO | 9221413 A1 | 12/1992 |
| WO | 9528210 A1 | 10/1995 |
| WO | 9607153 A1 | 3/1996 |
| WO | 9710577 A1 | 3/1997 |
| WO | 9814249 A1 | 4/1998 |
| WO | 9840136 A1 | 9/1998 |
| WO | 9943404 A1 | 9/1999 |
| WO | 9952610 A1 | 10/1999 |
| WO | 9952611 A1 | 10/1999 |
| WO | 200051076 A1 | 8/2000 |
| WO | 156670 A1 | 8/2001 |
| WO | 178854 A3 | 10/2001 |
| WO | 205914 A1 | 1/2002 |
| WO | 3026763 A1 | 4/2003 |
| WO | 2004067889 A1 | 12/2004 |
| WO | 2004112923 A1 | 12/2004 |
| WO | 2006031472 A2 | 3/2006 |

(56) References Cited

FOREIGN PATENT DOCUMENTS

| WO | 2006039308 A2 | 4/2006 |
| WO | 3004116 A1 | 11/2007 |
| WO | 2008005286 A2 | 1/2008 |
| WO | 2008006023 A2 | 1/2008 |
| WO | 2008091809 A2 | 7/2008 |
| WO | 2009067758 A1 | 6/2009 |
| WO | 2009137541 A2 | 11/2009 |
| WO | 2010052573 A2 | 5/2010 |
| WO | 2010055328 A2 | 5/2010 |
| WO | 2010117446 A2 | 10/2010 |
| WO | 2013019677 A2 | 2/2013 |
| WO | 2016058085 A9 | 4/2016 |

OTHER PUBLICATIONS

TableScanner "Accounting & Cage". Product Information Datasheets [online]. Advansys, 2013. Retrieved on Oct. 11, 2016 from the Internet: <URL: http://advansys.si/products/tablescanner/accounting-cage/> (4 pages).
TableScanner "Casino Management System". Product Information Datasheets [online]. Advansys, 2013. Retrieved on Oct. 11, 2016 from the Internet: <URL: http://advansys.si/> (6 pages).
TableScanner "Multisite". Product Information Datasheets [online]. Advansys, 2013. Retrieved on Oct. 11, 2016 from the Internet: <URL: http://advansys.si/products/tablescanner/multisite/> (3 pages).
TableScanner "Player Tracking". Product Information Datasheets [online]. Advansys, 2013. Retrieved on Sep. 23, 2016 from the Internet: <URL: http://advansys.si/products/tablescanner/player-tracking/> (4 pages).
TableScanner "Table Management system". Product Information Datasheets [online]. Advansys, 2013. Retrieved on Oct. 11, 2016 from the Internet: <URL: http://advansys.si/products/tablescanner/> (4 pages).
Tbm=pts&hl=en Google Search for card handling device with storage area, card removing system pivoting arm and processor; http://www.google.com/?tbrn=pts&hl=en; Jul. 28, 2012, 2 pages.
Tracking the Tables, by Jack Bularsky, Casino Journal, May 2004, vol. 17, No. 5, pp. 44-47.
"TYM @ a Glance—Table Games Yield Management", TYM LIVE Product Information Datasheets [online]. TANGAM Systems, 2016. Retrieved on Oct. 3, 2016 from the Internet: <URL: http://tangamgaming.com/wp-content/uploads/2016/12/TG_TYMGlance_2016-V4-1.pdf> (2 pages).
United States Court of Appeals for the Federal Circuit Decision Decided Dec. 27, 2005 for Preliminary Injuction for *Shuffle Master, Inc.* vs. *VendingData Corporation*, In the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, In the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, In the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, In the U.S. District Court, District of Nevada, No. CV-S-04-1373-JCM-LRL, Mar. 14, 2005.
1/3 " B/W CCD Camera Module EB100 by EverFocus Electronics Corp., Jul. 31, 2001, 3 pgs.
"ACE, Single Deck Shuffler," Shuffle Master, Inc., (2005), 2 pages.
Advansys, "Player Tracking" http://advansys.si/products/tablescanner/player-tracking/[Sep. 23, 2016 1:41:34 PM], 4 pages.
Australian Examination Report for Australian Application No. 2008202752, dated Sep. 25, 2009, 2 pages.
Australian Examination Report for Australian Application No. 2010202856, dated Aug. 11, 2011, 2 pages.
Australian Provisional Patent Application for Australian Patent Application No. PM7441, filed Aug. 15, 1994, Applicants: Rodney G. Johnson et al., Title: Card Handling Apparatus, 13 pages.
"Automatic casino card shuffle," Alibaba.com, (last visited Jul. 22, 2014), 2 pages.
Bally Systems Catalogue, Ballytech.com/systems, 2012, 13 pages.
Canadian Office Action for CA 2,580,309 dated Mar. 20, 2012 (6 pages).
Canadian Office Action for Canadian Application No. 2,461,726, dated Jul. 19, 2010, 3 pages.
Canadian Office Action for Canadian Application No. 2,461,726, dated Dec. 11, 2013, 3 pages.
CasinoTrac TableTrac Services. Product Information Datasheet [online]. CasinoTrac, 2015. Retrieved on Oct. 12, 2016 from the Internet: <URL: http://www.tabletrac.com/pageid=15#prettyPhoto> (3 pages).
Christos Stergiou and Dimitrios Siganos, "Neural Networks," http://www.doc.ic.ac.uk/~nd/surprise_96/journal/vol4/cs11/report.html (13 pages), Dec. 15, 2011.
Complaint filed in the matter of *SHFL entertainment, In.* v. *DigiDeal Corporation*, U.S. District Court, District of Nevada, Civil Action No. CV 2:12-cv-01782-GMC-VCF, Oct. 10, 2012, 62 pages.
Connect2Table Administrator Manual, Jan. 7, 2013 (82 pages).
Connect2Table Quick Installation Guide, Feb. 20, 2013 (36 pages).
Connect2Table Connect2Table System Summary, generated Oct. 21, 2016 (2 pages).
Connect2Table User Manual, Feb. 7, 2013 (35 pages).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 18 of 23 (color copies from Binder 1).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 19 of 23 (color copies from Binder 3).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 20 of 23 (color copies from Binder 4).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in case of *Shuffle Master, Inc.* v. *Card Aurstia, et al.*, Case No. CV-N-0508-HDM-(VPC) Consolidated with Case

(56) References Cited

OTHER PUBLICATIONS

No. CV-N-02-0244-ERC-(RAM)), May 6, 2003, scan of color pages, for clarity, Part 21 of 23 (color copies from Binder 6).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 22 of 23 (color copies from Binder 8, part 1 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 23 of 23 (color copies from Binder 8, part 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5).
DVD labeled Exhibit 1. This is a DVD taken by Shuffle Master personnel of the live operation of a CARD One2Si| Shuffler (Oct. 7, 2003). DVD sent to Examiner by US Postal Service with this PTO/SB/08 form.
DVD labeled Morrill Decl. Ex. A is (see Binder 4-1, p. 149/206, Morrill Decl., para. 2.): A video (16 minutes) that the attorney for CARD, Robert Morrill, made to describe the Roblejo prototype card shuffler. DVD sent to Examiner by US Postal Service with this PTO/SB/08 form.
DVD labeled Solberg Decl.Ex.C, which is not a video at all, is (see Binder 4-1, p. 34/206, Solberg Decl., para.8): Computer source code for operating a computer-controlled card shuffler (an early Roblejo prototype card shuffler) and descriptive comments of how the code works. DVD sent to Examiner by US Postal Service with this PTO/SB/08 form.
DVD labeled Luciano Decl. Ex. K is (see Binder 2-1, p. 215/237, Luciano Decl., para.14): A video demonstration (11minutes) of a Luciano Packaging prototype shuffler. DVD sent to Examiner by US Postal Service with this PTO/SB/08 form.
"Error Back propagation," http://willamette.edu~gorr/classes/cs449/backprop.html (4 pages), Nov 13, 2008.

"I-Deal," Bally Technologies, Inc., (2014), 2 pages.
"Shufflers—SHFL entertainment," Gaming Concepts Group, (2012), 6 pages.
"TAG Archives: Shuffle Machine," Gee Wiz Online, (Mar. 25, 2013), 4 pages.
European Search Report for European Application No. 12 152 303, dated Apr. 16, 2012, 3 pages.
European Patent Application Search Report—European Patent Application No. 06772987.1, dated Dec. 10, 2009, 5 pages.
European Examination Report for European Application No. 02 780 410, dated Jan. 25, 2010, 5 pages.
European Examination Report for European Application No. 02 780 410, dated Aug. 9, 2011, 4 pages.
Fine, Randall A., "Talking Tables", dated Apr. 25, 2012. Global Gaming Business Magazine, vol. 11, No. 5, May 2012. Retrieved on Oct. 3, 2016 from the Internet: <URL: https://ggbmagazine.com/issue/vol-11-no-5-may-2012/article/talking-tables> (4 pages).
Genevieve Orr, CS-449: Neural Networks Willamette University, http://www.willamette.edu/~gorr/classes/cs449/intro.html (4 pages), Fall 1999.
http://www.google.com/search?tbm=pts&q=Card+handling+devicve+with+input+and+outpu . . . Jun. 8, 2012.
http://www.ildado.com/casino_glossary.html, Feb. 1, 2001, p. 1-8.
https://web.archive.org/web/19991004000323/http://travelwizardtravel.com/majon.htm, Oct. 4, 1999, 2 pages.
http://www.google.com/search?tbm=pts&q=shuffling+zone+onOopposite+site+of+input+ . . . Jul. 18, 2012.
Litwiller, Dave, CCD vs. CMOS: Facts and Fiction reprinted from Jan. 2001 Issue of Photonics Spectra, Laurin Publishing Co. Inc. (4 pages).
Malaysian Patent Application Substantive Examination Adverse Report—Malaysian Patent Application Serial No. PI 20062710, May 9, 2009, 4 pages.
NEON Product Information Datasheets [online]. "Enterprise Casino Management, Table Management System, Mobile, Gaming". Intelligent Gaming, 2014. Retrieved on Oct. 12, 2016 from the Internet: <URL: http://www.intelligentgaming.co.uk/products/neon-enterprise/> (4 pages).
PCT International Preliminary Examination Report for International Patent Application No. PCT/US02/31105 dated Jul. 28, 2004, 9 pages.
PCT International Search Report for International Application No. PCT/US2003/015393, dated Oct. 6, 2003, 2 pages.
PCT International Search Report and Written Opinion, PCT/US2012/48706, dated Oct. 16, 2012, 12 pages.
PCT International Search Report for PCT/US2005/034737 dated Apr. 7, 2006, 1 page. (WO06/039308).
PCT International Search Report for PCT/US2007/022894, dated Jun. 11, 2008, 3 pages.
PCT International Search Report and Written Opinion of the International Searching Authority for PCT/US2010/001032, dated Jun. 16, 2010, 11 pages.
PCT International Search Report and Written Opinion for PCT/US07/15035, dated Sep. 29, 2008, 6 pages.
PCT International Search Report and Written Opinion for PCT/US07/15036, dated Sep. 23, 2008, 6 pages.
PCT International Search Report and Written Opinion, PCT Application No. PCT/US2015/051038, dated Jan. 22, 2016, 11 pages.
PCT International Search Report and Written Opinion of the International Searching Authority for PCT/US2008/007069, dated Sep. 8, 2008, 10 pages.
PCT International Search Report and Written Opinion, PCT Application No. PCT/US2015/022158, dated Jun. 17, 2015, 13 pages.
PCT International Search Report and Written Opinion for International Application No. PCT/US2007/023168, dated Sep. 12, 2008, 8 pages.
PCT International Search Report and Written Opinion, PCT Application No. PCT/US2015/040196, dated Jan. 15, 2016, 20 pages.
PCT International Search Report and Written Opinion, PCT Application No. PCT/US2013/062391, dated Dec. 17, 2013, 13 pages.
PCT International Search Report and Written Opinion of the International Searching Authority for PCT/US05/31400, dated Sep. 25, 2007, 12 pages.

(56) References Cited

OTHER PUBLICATIONS

PCT International Search Report and Written Opinion, PCT Application No. PCT/US2015/025420, dated Oct. 2, 2015, 15 pages.
PCT International Search Report and Written Opinion of the International Searching Authority for PCT/US13/59665, dated Apr. 25, 2014, 21 pages.
PCT International Search Report and Written Opinion of the International Searching Authority for PCT/IB2013/001756, dated Jan. 10, 2014, 7 pages.
PCT International Search Report and Written Opinion of the International Searching Authority for PCT/US11/59797, dated Mar. 27, 2012, 14 pages.
PCT International Search Report and Written Opinion for International Application No. PCT/US2007/022858, dated Mar. 7, 2008, 7 pages.
PCT International Search Report and Written Opinion for International Patent Application No. PCT/US2006/22911, dated Jun. 1, 2007, 6 pages.
PCT International Search Report and Written Opinion of the International Searching Authority for PCT/GB2011/051978, dated Jan. 17, 2012, 11 pages.
Philippines Patent Application Formality Examination Report—Philippines Patent Application No. 1-2006-000302, dated Jun. 13, 2006.
"Playtech Retail begins roll out of Neon across Grosvenos 55 UK Casinos". Playtech, Apr. 21, 2016. Retrieved on Oct. 11, 2016 from the Internet: <URL: https://www.playtech.com/news/latest_news_and_prs/playtech_retail_begins_roll_out_of_neon_across_grosvenor_s_55_uk_casinos> (1 page).
Press Release for Alliance Gaming Corp., Jul 26, 2004—Alliance Gaming Announces Control with Galaxy Macau for New MindPlay Baccarat Table Technology, 2 pages, http://biz.yahoo.com/prnews.
Scarne's Encyclopedia of Games by John Scarne, 1973, "Super Contract Bridge", p. 153.
Shuffle Master Gaming, Service Manual, ACETM Single Deck Card Shuffler, (1998), 63 pages.
Shuffle Master Gaming, Service Manual, Let It Ride Bonus® With Universal Keypad, 112 pages, © 2000 Shuffle Master, Inc.
Service Manual/User Manual for Single Deck Shufflers: BG1, BG2 and BG3 by Shuffle Master © 1997, 151 page.
Singapore Patent Application Examination Report—Singapore Patent Application No. SE 2008 01914 A, dated Jun. 18, 2008, 9 pages.
SHFL Entertainment, Inc., Opening Claim Construction Brief, filed in Nevada District Court Case No. 2:12-cv-01782 with exhibits, Aug. 8, 2013, p. 1-125.
Shuffle Master's Reply Memorandum in Support of Shuffle Master's Motion for Preliminary Injunction for *Shuffle Master, Inc.* vs. *VendingData Corporation*, in the U.S. District Court, District of Nevada, No. CV-S-04-1373-JCM-LRL, Nov. 29, 2004.
Statement of Relevance of Cited References, Submitted as Part of a Third-Party Submission Under 37 CFR 1.290 on Dec. 7, 2012 (12 pages).
Shuffle Master, Inc. (1996). Let It Ride, The Tournament, User Guide, 72 pages.
U.S. Appl. No. 15/276,476, filed Sep. 26, 2016, titled "Devices, Systems, and Related Methods for Real-Time Monitoring and Display of Related Data for Casino Gaming Devices", to Nagaragatta et al., 36 pages.
U.S. Appl. No. 15/365,610, filed Nov. 30, 2016, titled "Card Handling Devices and Related Assemblies and Components", to Helsen et al., 62 pages.
Weisenfeld, Bernie; Inventor betting on shuffler, Courier-Post; Sep. 11, 1990; 1 page.
Solberg, Halvard; Deposition; *Shuffle Tech International* v. *Scientific Games Corp., et al*. 1:15-cv-3702 (N.D. Ill.); Oct. 18, 2016; pp. 187, 224-246, 326-330, 338-339, 396; Baytowne Reporting; Panama City, FL.
Prototype Glossary and Timelines; *Shuffle Tech International* v. *Scientific Games Corp.*, et al. 1:15-cv-3702 (N.D. Ill.); undated; pp. 1-4.
Olsen, Eddie; Automatic Shuffler 'ready' for Atlantic City experiment; Blackjack Confidential; Jul./Aug. 1989; pp. 6-7.
Gros, Roger; New Card Management System to Be Tested at Bally's Park Place; Casino Journal; Apr. 1989; 5 pages.
Gola, Steve; Deposition; *Shuffle Tech International* v. *Scientific Games Corp., et al*. 1:15-cv-3702 (N.D. Ill.); Oct. 13, 2016; pp. 1, 9-21, 30-69, 150-167, 186-188, 228-231, 290-315, 411; Henderson Legal Services, Inc.; Washington, DC.

\* cited by examiner

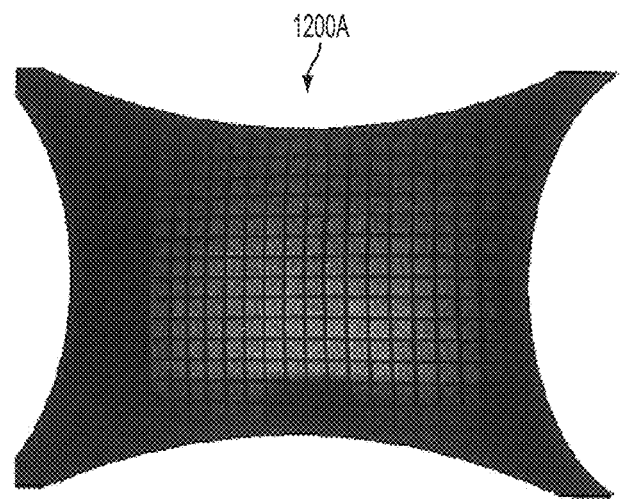
FIG. 12A
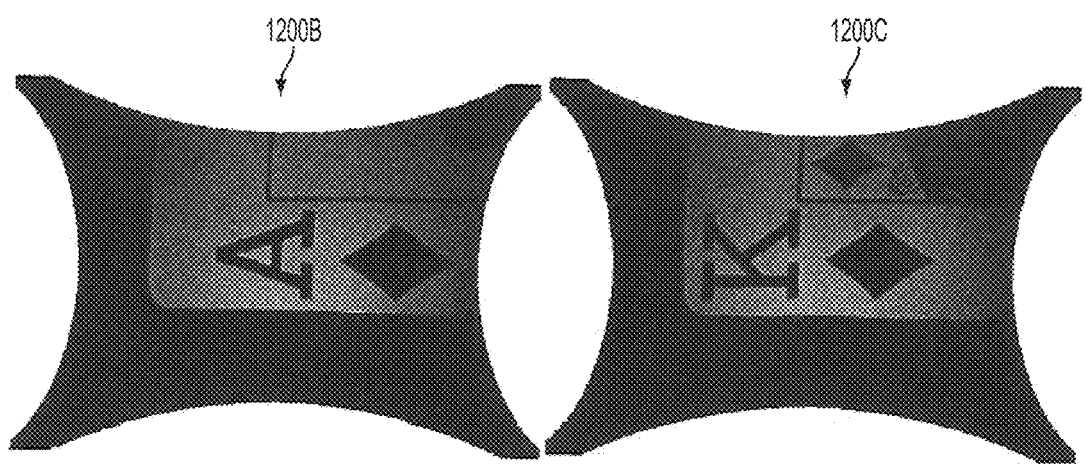
FIG. 12B
FIG. 12C

CARD RECOGNITION SYSTEM, CARD HANDLING DEVICE, AND METHOD FOR TUNING A CARD HANDLING DEVICE

CROSS-REFERENCE TO RELATED APPLICATIONS

This application is a continuation of U.S. patent application Ser. No. 14/670,165, filed Mar. 26, 2015, now U.S. Pat. No. 9,679,603, issued Jun. 13, 2017, which application is a divisional of U.S. patent application Ser. No. 13/631,658 filed Sep. 28, 2012, now U.S. Pat. No. 9,378,766, issued Jun. 28, 2016, the disclosure of each of which is incorporated herein in its entirety by this reference.

FIELD

The disclosure relates generally to card recognition in card handling devices. More specifically, disclosed embodiments relate to automatic generation of calibration files and other improvements to card recognition systems of card handling devices.

BACKGROUND

Card handling devices (e.g., card shufflers) are used in the gaming industry for increasing the efficiency, security, and game speed in live table games, such as Blackjack, Baccarat, and various forms of poker. Card handling devices may perform a variety of functions including randomly shuffling one or more decks of cards in an efficient and thorough manner. In a live table game, shuffling the cards in an efficient and thorough manner may assist in preventing players from having an advantage by knowing the position of specific cards or groups of cards in the final arrangement of cards delivered in the play of the game. Additionally, it may be desirable to shuffle the cards in a very short period of time in order to reduce delay in the play of the game.

Card shufflers may include a card recognition system, which may be used to verify the contents of the card set, such as one or more decks and ensure that the card set contains all the appropriate cards, and also to detect any cards which do not belong therein. The card recognition system may also enable a card shuffler to verify the contents of the deck throughout the game play. Some known card shufflers may comprise a card recognition system that employs sensors and a hardware component that may sense the rank (2-10, Jack-Ace) and suit (spade, club, heart, diamond) from the face of a card and thereafter convert signals from the sensed data into vector sets. The vector sets may be compared to known vector sets of a verified deck of cards. Other known card shufflers may comprise a camera that captures an unknown image of each card entered into the card shuffler and then extracts the card rank and suit from the unknown image. The unknown image may be compared to master images of a verified deck of cards to identify the cards.

There are several different card manufacturers (e.g., Angel, Gemaco, U.S. Playing Card Company, Cartamundi, Ace, Copag, etc.) each having different types of card designs. For example, the card images (e.g., graphics) printed on the card faces may vary from one deck to the next. In addition, the size and location of the rank and suit may also vary from one deck design to the next.

In order to support each of the various possible card images, the card recognition system of the card shuffler may be loaded with a set of master images containing the rank and suit symbols of a particular deck design. The master images may be stored in memory within the card shuffler in a particular subdirectory associated with that particular deck design. For example, a subdirectory may exist for each deck type supported by the card shuffler. The process of creating these master images conventionally requires a substantial amount of manual measurement and analysis by a technician to create and load the master images for each deck type. For example, the technician may manually enter parameters into a calibration file listing different measurements and locations related to the rank and suit symbols. This process involves trial and error, and is time consuming as the technician attempts to find the right combination of parameters to use in generating the master images.

Another obstacle associated with conventional card detection devices is that card manufacturers may create new deck designs or make changes to existing deck designs. The conventional method of manually creating deck libraries becomes burdensome to technicians who not only have to create the deck libraries, but also need to update the deck libraries of card shufflers in use in the field. In addition, each individual card shuffler may be configured differently, which may require the technician to create a new calibration file for a particular machine. As a result, when the same deck library is created for one card shuffler and then simply reproduced and stored on each additional card shuffler, there may be variations during card recognition from one card shuffler to the next, even within the same model of shuffler.

Once loaded onto a card shuffler, the dealer may select the specific deck design that will be used during game play. Selecting the deck in the card shuffler determines which deck library (e.g., master images and other related files) is used for comparison with the card images captured during use. The dealer may select the incorrect deck type, often for reasons such as a lack of training or simple input error. As a result, the deck library from one deck type may be used for comparison with images from another deck type. Using the wrong deck library may result in errors in card identification.

BRIEF DESCRIPTION OF THE DRAWINGS

FIGS. 12A, 12B, and 12C are images for which the fisheye distortion has been reduced through mathematical stretching of the distorted image.

DETAILED DESCRIPTION

Figure 1:
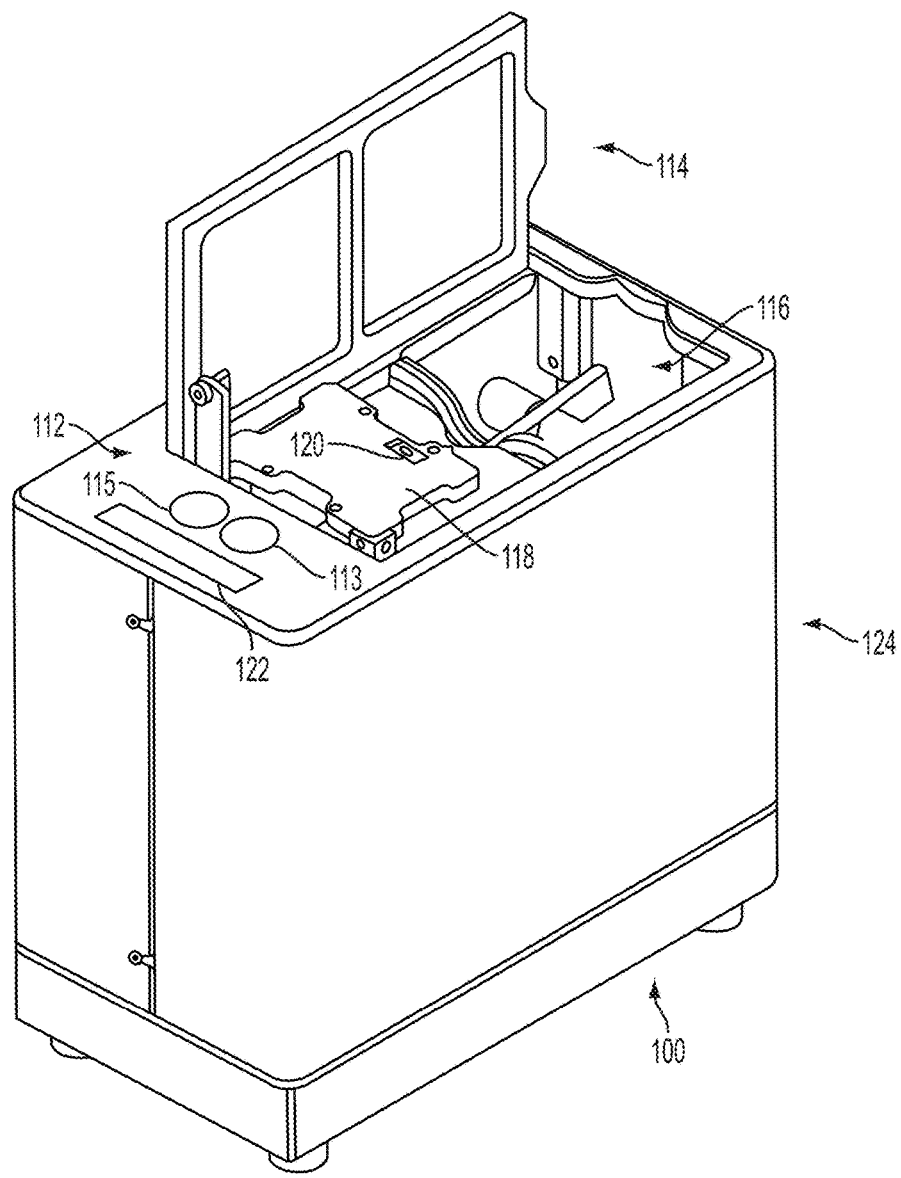
FIG. 1 is a perspective view of a card handling device according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the claimed invention is defined only by the appended claims and their legal equivalents. Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

As used herein, the term "master image" is an image generated by a card recognition system during calibration mode that may be stored for future comparison with unknown images to identify a card during card recognition mode. The master images may include separate master images for each rank and suit of a deck. There may also be master images for other symbols, such as joker and Wagner symbols. In some embodiments, a master image may include both the rank and the suit of an individual card, such that each individual card has its own master image. A "raw image" is an image generated by a card recognition system during calibration mode and may be used to generate the master image. An example of a "raw image" is an image generated by a two-dimensional (2D) CMOS image sensor. As discussed below, the master images may be generated according to parameters stored in an automatically generated calibration file. In the context of card recognition, a "raw image" may be generated and used to generate an unknown image. The term "unknown image" is an image that is generated by the card recognition system for comparison with a master image to identify a card rank and suit during card recognition mode.

Figure 2:
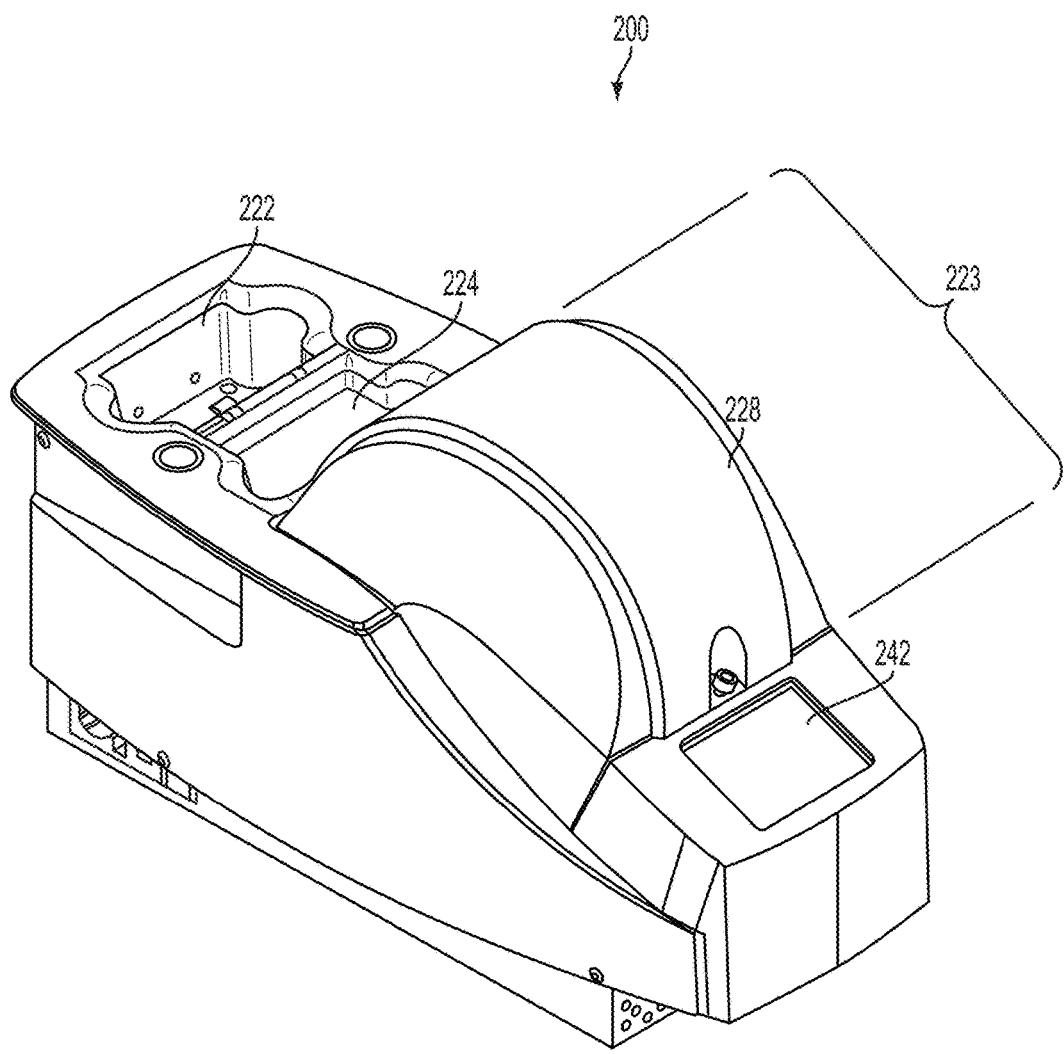
FIG. 2 is a perspective view of a card handling device according to another embodiment of the present disclosure.
Figure 3:
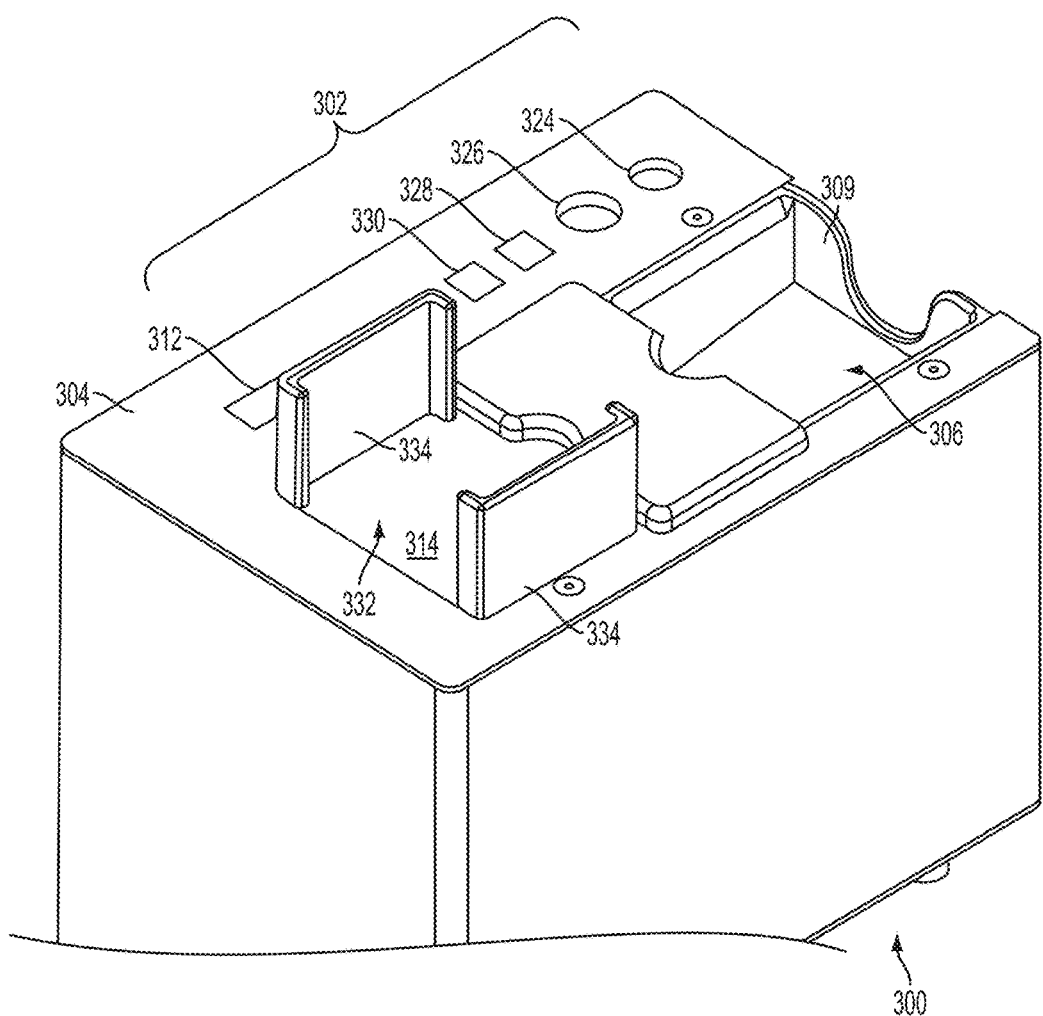
FIG. 3 is a partial perspective view of a card handling device according to another embodiment of the present disclosure.

Embodiments of the present disclosure include card handling devices, card recognition systems, and related methods. It is contemplated that there are various configurations of card handling devices that may include a card recognition system according to an embodiment of the present disclosure. FIGS. 1 through 3, described below, are non-limiting examples of such card handling devices that may employ card recognition systems and methods of the present disclosure. Of course, other configurations of card handling devices are also contemplated.

FIG. 1 is a perspective view of a card handling device 100 according to an embodiment of the present disclosure. The card handling device 100 may be configured to randomize sets of cards, such as decks and sets of multiple decks of cards. The card handling device 100 may include a top surface 112 that comprises a flip-up cover 114 which, when opened, may expose a card insertion area 116 and an elevator platform 118. The card insertion area 116 may be configured to receive an input set of cards to be shuffled, counted, and/or sorted. The card handling device 100 may be configured to receive, read rank and suit, sort, and/or shuffle one or more decks of cards (e.g., standard deck of 52 cards each, 52 cards plus one or two jokers, etc.). The card handling device 100 may be particularly well suited for providing randomized decks of cards for card games, such as blackjack, poker, etc. In some embodiments, the card handling device 100 may be located adjacent to, or flush mounted into, a gaming table surface in a casino where a live card game may be played. In some embodiments, the card handling device 100 may be located at a remote location off the casino floor, which may be inaccessible to the public.

The elevator platform 118 may be configured to raise a set of shuffled cards to a level where the cards may be removed by a device user after the shuffling, reading, and/or sorting processes are completed. A body 124 of the card handling device 100 may include a card recognition system 400 (FIG. 4) therein. The card recognition system 400 may be configured to recognize the identity of the cards as the cards pass through the card handling device 100. The elevator platform 118 may include a card present sensor 120 configured to detect the presence of a card located on the elevator platform 118. Other card present sensors 430 (FIG. 4) in the card recognition system 400 may trigger the card recognition system to capture the image of the card.

The card handling device 100 may also be configured to display operational data relating to the device to a display panel 122 located on the top surface 112. An operator using the card handling device 100 may monitor the display panel 122 and view the displayed information in order to know the status of operation of the card handling device 100. Such information displayed on display panel 122 may include the number of cards present in the card handling device 100, the status of any shuffling, reading, or sorting operations, security information relating to the card handling device 100, status relating to a card verification process, or any other information about errors, or the operation of card handling device 100 that would be useful to the operator. The display panel 122 may include a user interface for the user to interact with the card handling device 100. For example, buttons 113, 115 may control operations, such as power on/off, special functions (e.g., raise elevator to the card delivery position, reshuffle command, security check, card count command, etc.), and the like.

Additional details regarding such a card handling device are described in U.S. Pat. No. 7,764,836, issued Jul. 27, 2010, and entitled "Card Shuffler with Card Rank and Value Reading Capability Using CMOS Sensor," and U.S. Patent Application Publication No. 2008/0113700, filed Nov. 10, 2006, and entitled "Methods and Apparatuses for an Automatic Card Handling Device and Communication Networks Including Same," the disclosure of each of which is incorporated herein in its entirety by this reference.

FIG. 2 is a perspective view of another card handling device 200 according to another embodiment of the present disclosure. The card handling device 200 may include a recessed card infeed tray 222, a recessed card output tray 224, and a plurality of card shuffling compartments (not shown) arranged into a carousel structure 223 that are configured to shuffle a deck of cards inserted into the infeed tray 222 and outputted in smaller groups, such as hands and/or partial hands to the card output tray 224 during use. The shuffling compartments of the carousel structure 223 may be enclosed within a cover. A card present sensor (not shown) in the output tray 224 may generate a signal that causes the processor to instruct mechanical elements to dispense another group of cards after the last group of cards is removed. The card handling device 200 may further include a dealer display 242 that may include touch screen controls for the dealer to input commands for the card handling device 200. The card handling device 200 may be flush mounted on a gaming table. Additional details regarding such a card handling device are described in U.S. Patent Application Publication No. 2008/0006997, filed Jul. 5, 2006, and entitled "Card Shuffler with Adjacent Card Infeed and Card Output Compartments," the disclosure of which is incorporated herein in its entirety by this reference. The card handling device 200 may further include a card recognition system (FIG. 4) that may be housed within the cover 228, and which will be described in further detail below.

FIG. 3 is a partial perspective view of a card handling device 300 according to yet another embodiment of the present disclosure. The card handling device 300 includes a card receiving area 306 that may be provided with a stationary lower support surface that slopes downwardly from an outer side 309 of the card handling device 300. The outer side 309 may include a depression configured to facilitate an operator's ability to place or remove cards into the card receiving area 306. A top surface 304 of the card handling device 300 may include a user interface 302 that may include a visual display 312 (e.g., LED, liquid crystal, micro monitor, semiconductor display, etc.), and one or more user inputs 324, 326. The user inputs 324, 326 may include one or more buttons, touch screens, etc. The interface 302 may further include additional lights and/or displays 328, 330, which may be configured to indicate power availability (on/off), a shuffler state (e.g., active shuffling, completed shuffling cycle, insufficient numbers of cards, missing cards, sufficient numbers of cards, complete deck(s), damaged or marked cards, entry functions for the dealer to identify the number of players, the number of cards per hand, access to fixed programming for various games, the number of decks being shuffled, card calibration information, etc.), or other information useful to the operator.

The card handling device 300 may further include a shuffled card return area 332. The shuffled card return area 332 may include an elevator surface 314 and card-supporting sides 334 that surround at least a portion of the elevator surface 314. In some embodiments, the card-supporting sides 334 remain fixed to the elevator surface 314 during operation. In other embodiments, the card-supporting sides 334 may be fixed to the frame and does not move. In some embodiments, the card-supporting sides 334 may be removable. Removal of the card-supporting sides 334 may enable the operator to lift shuffled groups of cards onto a gaming table surface for use in a card game. Additional details regarding such a card handling device are described in U.S. Patent Application Publication No. 2007/0069462, filed Jul. 18, 2006, and entitled "Card Shuffler with Card Rank and Value Reading Capability Using CMOS Sensor," the disclosure of which is incorporated herein in its entirety by this reference. The card handling device 300 may further include a card recognition system (not shown), which will be described in further detail below.

Depending on the configuration of the card handling device employed, the physical configuration of the card recognition system may also vary from one card handling device to the next. For example, the placement of the imaging device may be different (e.g., different angles) from one card handling device to the next, which may result in the need to generate and maintain different deck libraries for the various types of card handling devices. According to conventional methods for generating deck libraries and master images where each step is performed manually, the need to maintain deck libraries for various types of card handling devices is increased with the different shuffler structures, which may further add to the benefits and advantages of embodiments of the present disclosure.

Figure 4:
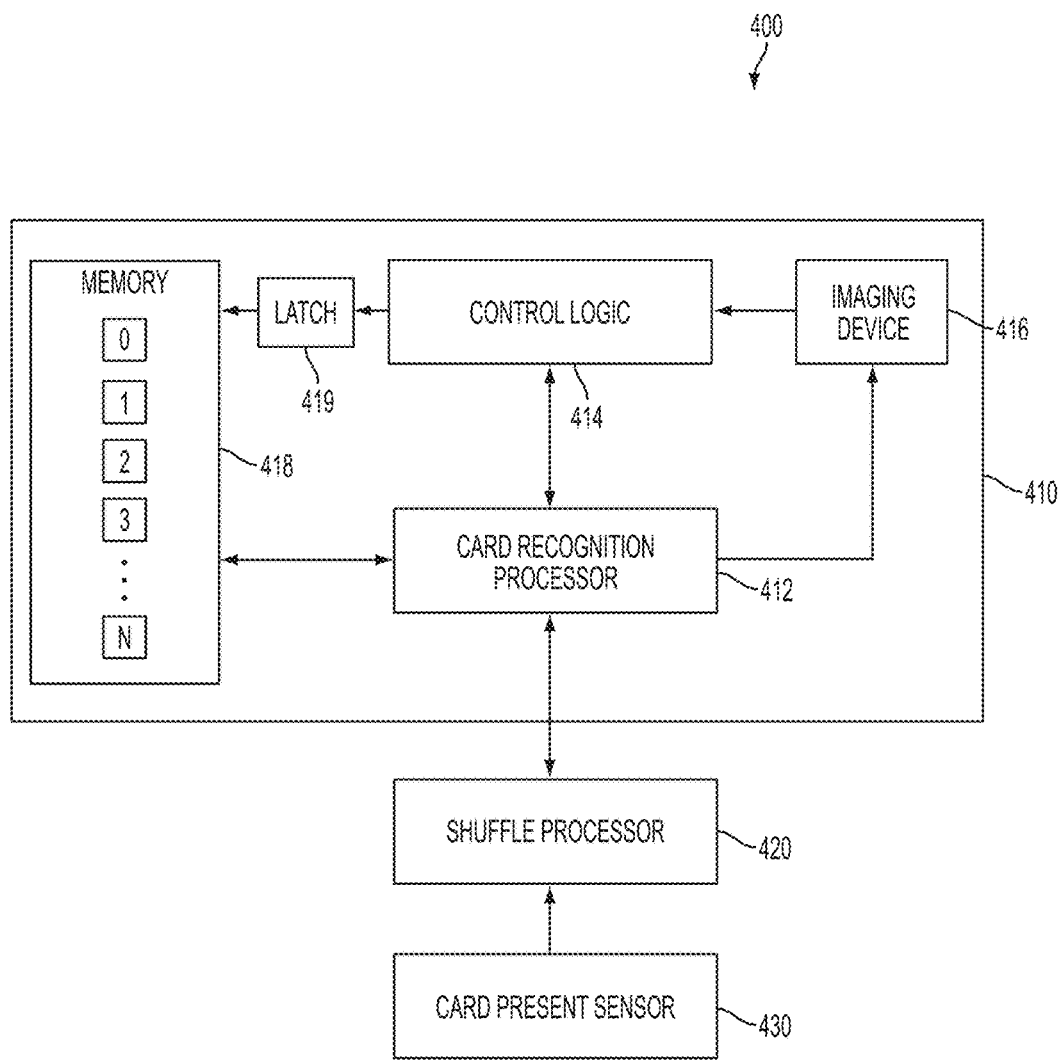
FIG. 4 is a schematic block diagram of a card processing system for a card handling device according to an embodiment of the present disclosure.

FIG. 4 is a schematic block diagram of a card processing system 400 for a card handling device according to an embodiment of the present disclosure. The card processing system 400 may include a card recognition system 410 and a shuffle processor 420. The shuffle processor 420 may be configured to control the shuffling of the cards, as well as the motors, rollers, etc. that move the cards through the card handling device. The card processing system 400 may further include a card present sensor 430.

The card recognition system 410 includes a card recognition processor 412, control logic 414, an imaging device 416, a memory device 418, and a latch 419. The card recognition processor 412 may be coupled with each of the control logic 414, the imaging device 416, and the memory device 418. The latch 419 may be coupled between the control logic 414 and the memory device 418. The control logic 414 may be coupled with the imaging device 416 to receive captured images from the imaging device 416. The imaging device 416 may be positioned and oriented within the card handling device, such that at least a portion of the card may be placed within its field of view when capturing an image of the card (i.e., reading the card). In some embodiments, the portion of the card within the field of view may be the upper-left hand corner of the card. Cards may be read when stationary or in motion.

The card present sensor 430 may be coupled with the card recognition system 410 to signal when a card is present for the imaging device 416 to read. In some embodiments, the card present sensor 430 may be coupled to the card recognition system 410 through the shuffle processor 420. In other embodiments, the card present sensor 430 may be coupled directly to the card recognition processor 412 or the imaging device 416.

The card recognition processor 412 may be configured (e.g., programmed) to control the operation of the card recognition system 410 to operate in either a tuning mode (i.e., generating a calibration file) or a card recognition mode (i.e., comparing an unknown image with a master image). The tuning mode may also be referred to herein as the "calibration mode." In the tuning mode, the card recognition processor 412 may be further configured to automatically generate the calibration file used by the control logic 414 when generating master images for the complete set of reference rank and suit symbols. The card recognition processor 412 may run an operating system (e.g., Linux) having a file system. The file system may be organized in subdirectories for each deck type to which the card recognition system 410 has been tuned. The subdirectories may have files stored therein, such as a calibration file, a deck name file, and a plurality of master images, as will be discussed in more detail below. The card recognition processor 412 may be configured to instruct the imaging device 416 to capture the image (e.g., responsive to a signal from the card present sensor 430). The card recognition processor 412 may also be configured to communicate information to input and output devices (not shown), such as a display, operator inputs, etc.

The control logic 414 may include an FPGA or comparable hardware component configured to identify cards by rank and suit. The control logic 414 may be configured to process a raw image data captured by the imaging device 416, the raw image data being processed according to one or more parameters stored in the calibration file to generate the rank images and the suit images used as master images during the tuning mode. The control logic 414 may be further configured to generate the unknown images used during the card recognition mode. In addition, during card recognition mode, the control logic 414 may be configured to compare the generated unknown rank and suit images with master rank and suit images to determine the identity (ID) of the card.

The imaging device 416 may include a camera (e.g., 2D CMOS imager) configured to take a two-dimensional image of its field of view. The imaging device 416 may include an analog camera or a digital camera with a decoder or receiver that converts received radiation into signals that can be analyzed with respect to image content. The signals may reflect either color or black-and-white information, or merely measure shifts in color density and pattern. The imaging device 416 may include one or more lenses to focus light, mirrors to direct light, and additional radiation emitters to assure sufficient radiation intensity for imaging by the imaging device 416. For example, the additional radiation emitters may include LED light sources (not shown) to illuminate areas of a card being imaged. Although a white light source may sometimes be adequate to capture gray scale data from red and black print on cards, a green light source may be an efficient source of illumination for capturing black and white data from both red and black print on cards.

The memory device 418 may be configured to store the captured raw images for each of the cards of the deck. The raw images may include rank and suit symbols of the corresponding card. The raw images may be read in by the imaging device 416 to be used by the card recognition processor 412 during tuning mode to generate the calibration file. The raw images may further be provided to the control logic 414 during tuning mode to generate a set of master images. The memory may have N locations available for storing the raw images for each card, wherein N is any positive integer. For most standard decks, N may be 52. In some embodiments, N locations may include additional locations for jokers, special cards, blank cards, or other symbols. Decks of cards having more or fewer than 52 cards (e.g., cards with certain cards added or removed) are also contemplated. In addition, the calibration file and master images may be generated using a sub-set of all cards of the deck. In other words, a raw image may not be captured for each and every card in the deck so long as at least one raw image is available for each rank and each suit in the deck. As a result, N may be fewer than the total number of cards in the deck.

The latch 419 may be configured to select which location in the memory device 418 that a particular raw image should be stored in. For example, as the raw image for a card is successfully stored, the latch 419 may increment so that the raw image for the next card may be stored in the next location in memory device 418. If the raw image for a card is not successfully stored, the latch 419 may not increment.

The tuning mode may be employed to tune a card recognition system 410 for use with a particular deck of cards. The deck of cards may be inserted into the card handling device and the rank and suit information may be read by the card recognition system 410. Information from each card of the deck may be read into the card recognition system 410. In other words, the imaging device 416 captures a raw image for at least a portion of some of the cards (e.g., rank and suit symbols) of the deck to be used for tuning the card recognition system 410. In other embodiments, a larger portion of the card face (e.g., the entire card face) may be captured by the imaging device 416. The raw images are stored in the memory device 418. At the close of reading all or a portion of each card in the deck, the memory device 418 may have a raw image stored in memory device 418 for each card of the deck. In some embodiments, the cards may be read in a predetermined order, while in other embodiments, the cards may be read in any order. At this point, the raw images stored in the memory device 418 may not be processed, but represent full images for the entire field of view of the imaging device 416, including each rank and suit symbol.

The card recognition processor 412 may be configured to perform an image processing analysis of the raw image identifying measurements (e.g., sizes of areas, coordinates, dimensions, etc.) related to at least one of a rank area around a rank of the card, and a suit area around a suit of the card, an area around both the rank and the suit, and automatically generate a calibration file based, at least in part, on the image processing analysis, as discussed in more detail below. The card recognition processor 412 may perform an image processing analysis to automatically identify a size and location of the rank and suit symbols of at least one card. As an example, the card recognition processor 412 may perform a "blob" analysis on one or more of the raw images stored in the memory device 418. An example of such an image processing program capable of being programmed to perform the analysis described herein includes OpenCV (Open Source Computer Vision Library) developed by Intel Corporation of Santa Clara, Calif. Other blob analysis software may also be employed, such as MATLAB developed by Mathworks of Natick, Mass.

The blob analysis may be configured to locate "blobs" within a selected raw image. A blob may include a point and/or a region in the image that differs in some property. For example, the blob analysis may locate black regions of a black-white image or may analyze intensity of a grayscale image. Although the term "raw image" is used during the description of the blob analysis, the image that is analyzed may be processed. For example, the card recognition processor 412 may convert the raw image to black and white, may crop (or ignore) the raw image to a region of interest around the card that is of a smaller size than the field of view of the imaging device 416, etc., prior to performing the blob analysis. In this context, the term "raw image" is intended to mean that the image is not a master image, and not necessarily that no processing of the image has been performed.

The blob analysis may be used to locate a number of blobs from the selected raw image, which may be further analyzed to determine the locations and measurements (e.g., in pixels) for the rank area 508 (FIG. 5) and suit area 510 (FIG. 5) as well as other related parameters that are part of the calibration file. As an example, the blob analysis may determine an initial number of blobs within the raw image. The initial number of blobs may be relatively large (e.g., 3000 blobs) based on the artwork on the card that is present within the field of view of the imaging device 416. The blob analysis may also return a location (e.g., centroid) of each blob within the raw image, as well as the measurements (e.g., height, width, etc.) of each blob. Because the rank and suit of most cards may be expected to have at least a minimum size, relatively small blobs may be ignored by the card recognition processor 412 for purposes of finding the rank and suit. In addition, because the rank and suit of most cards may be expected to be located near the corners of the cards, blobs that are outside of that expected region may also be ignored. As a result, the remaining blobs left to be analyzed should include the rank and suit of the card.

In some embodiments, finding the "10" number rank (i.e., excluding other cards, such as jack, king, etc.) may be used as a basis for defining parameters for the rank area and suit area, because of one or more unique qualities about the 10 rank that may be helpful to identify the rank. For example, the 10 rank may be recognizable because the 10 rank has two relatively large blobs that are side by side. Each of the two blobs may have approximately the same location on the Y-axis for the centroid, along with approximately the same height. In addition, the blob analysis may verify that one blob is narrow (the "1") whereas the other blob is wide (the "0"). The 10 rank may also be useful in defining the measurements of the rank area because the 10 rank may have the largest area of the various ranks.

The location and measurements defining the suit area may be determined by locating and defining an area of a relatively large blob near the 10 rank. The suit may also be expected to be the blob located below the rank (in the Y direction) for most decks. As a result, the card recognition processor 412 may use a blob located below the 10 rank for defining the measurements of the suit area in the calibration file. Thus, from the blob analysis the measurements for the rank area 508 and the suit area 510 may be obtained. The final values stored in the calibration file may include some padding, which may compensate for the potential of variations in card position or orientation. Thus, the card recognition processor 412 may automatically generate a calibration file having parameters associated with locating the rank and suit within an image or partial image. Examples of parameters that may be stored in the calibration file are discussed below with reference to FIG. 5. The calibration file may be stored in a file system in a memory (e.g., non-volatile memory) associated with the card recognition processor 412. The calibration file may also be stored in memory (e.g., volatile memory) associated with the control logic 414.

Using the calibration file, the control logic 414 may process the raw images stored in the memory device 418 to generate the master images to be used in the card recognition mode. In some embodiments, only a selected portion of the raw images may be fed back from the memory device 418 into the control logic 414 for generating the master images. In some embodiments, an image for each rank from one of the suits may be used to generate the master image for that rank. For example, the ace of diamonds may be used to obtain the master image associated with the ace rank, while the other ace cards (e.g., ace of spades, ace of hearts, ace of clubs) may be ignored. The master images for the other ranks may be generated in a similar manner. While generating the master images for the ranks, certain card images may be selected to generate a master image for each suit as well. In other embodiments, each raw image may be used to obtain a master image for each rank and suit. As a result, a plurality of master images may be generated for each rank and suit. For example, four separate master images may be created for the ace rank (i.e., one ace image from a card for each suit). The card recognition processor 412 may then analyze each of the master images for that rank to determine which of the master images is desired to be used as the ultimate master image during the card recognition mode. In other words, the card recognition processor 412 may choose what it considers "the best" image from among a plurality of images to select the master image for a particular rank or suit. The best image may be determined by comparing against each of the other master images to obtain a score that is most dissimilar to the others so that the separation between master images is the greatest. Other factors or determinations may be used for, or contribute to, the determination of which master image is to be used as the master image for a particular rank or suit.

In some embodiments, the card recognition processor 412 may create the master images at the same time that the calibration file is generated. As a result, the blob analysis may be used by the card recognition processor 412 to locate, measure, and crop the master images before the calibration file is generated.

After the master images are generated, the card recognition processor 412 may associate the master images with the appropriate rank and suit. The master images may also be stored in the file system of the memory associated with the card recognition processor 412. In some embodiments, the master images may be associated with the corresponding rank and suit by having the cards read in a predetermined order using a sorted deck. Thus, each master image is assigned its rank or suit according to the order the master image was saved in the memory device 418. Such an embodiment, however, may rely on the card manufacturer or technician (or dealer, pit boss, etc.) who inserts the deck into the card handling device to insert a sorted deck. Inserting an unsorted deck into such an embodiment may result in improper associations between the proper ranks and suits.

In some embodiments, the card recognition system 410 may be configured to make the proper associations even with an unsorted deck. For example, the proper associations for the ranks and suits may be determined from a secondary analysis of the master images. For example, the card recognition processor 412 may be configured to analyze the curvature of the rank and suit symbols in the master images to make the associations with the appropriate ranks and suits. In some embodiments, the master images may be compared with each other, such that a score may be determined between each master image. In other words, the master images may be associated with the appropriate ranks and suits indirectly from other master images rather than direct association based on the expected identity.

For example, a score may be determined for a comparison between the master images for the 1 rank and the 2 rank, the 1 rank and the 3 rank, the 1 rank and the 4 rank, etc. Similarly, a score may be determined between the master images for the 2 rank and the 3 rank, the 2 rank and the 4 rank, etc. Scores for the other ranks (3-10, J, Q, K, A) may be determined as well. Of course, at this point the master images are unassociated with any particular rank, and the actual identity of the master image may not yet be known to the card recognition processor 412. The method of comparison includes determining a number (or percentage) of matched pixels, determining a number (or percentage) of unmatched pixels, comparing a shape of an edge of a symbol, or other methods of comparison.

Of course, the scores for comparisons of different master images would be dissimilar and would not result in a match. However, the score for a comparison of the 1 rank and the 7 rank may be more similar to each other than the score between the 1 rank and the 2 rank. In fact, each card rank may have a different rank that may result in a closest secondary match. For example, for some decks, the following table may represent the next best match for various ranks. The score represented in Table 1 below is a percentage of pixel matching as described in further detail below.

TABLE 1

| Rank | Next Best Match Rank | Score (%) |
|---|---|---|
| A | J | 20 |
| 2 | 4 | 20 |
| 3 | 5 | 15 |
| 4 | J | 17 |
| 5 | 6 | 9 |
| 6 | 5 | 12 |
| 7 | 4 | 19 |
| 8 | 6 | 17 |
| 9 | J | 20 |
| 10 | Q | 18 |
| J | 4 | 17 |
| Q | 4 | 17 |
| K | J | 19 |

The next best matches shown in Table 1 is to be understood as an example for one style of card deck. Similarly, the scores shown in Table 1 may be approximates. Of course, as decks may vary from one design to the next, the next best match and the score may also differ from one deck to the next. In addition, the analysis regarding the secondary comparisons of master images may also consider the expected matches beyond the next best match. In other words, the accuracy may be improved if the third best match, the fourth best match, etc. may be considered. In some embodiments, a specific master image may be used as a baseline master image to determine the associations for the other master image. For example, the blob analysis may be used to identify a 10 rank by searching for the unique characteristics of the 10 rank. The master image for the 10 rank may then be used to compare with the unassociated master images. In other words, the 10 rank is compared with an unassociated rank master image to obtain a first score, the 10 rank is compared with another unassociated rank master image to obtain a second score, and so on. Each rank may have a score that is different with respect to a comparison with the 10. These different scores may be associated to a corresponding rank based on the expected relative match to the 10 rank. Other ranks may be used as the baseline master image. In some embodiments, the deck may be required to be only partially sorted, such as requiring the technician to have a specific card as the first card read from the deck. For example, the queen of hearts may be required to be the first card read from the deck. The master images for the queen rank and the hearts suit may then be used as the baseline master image similar to the process described above for using the 10 rank.

As a result, the master image for each rank may be compared with the other master images of the remaining ranks with the score for each comparison being saved. The scores from these secondary comparisons may be analyzed to determine the proper associations for the master images. The master images for the suits may be associated with the appropriate suits in a similar manner. For example, as the cards may be read in a predetermined order, the master images may be associated with the appropriate suit based on the known position of that suit. In other embodiments, secondary analysis may be used to determine the identity of the suit for the master image, such as analyzing the curvature of the suit shapes or from comparisons of the other master images to determine the identity from secondary relationships of non-matching master images. Such secondary analysis may be beneficial for situations when the deck may not be sorted in any particular order. Such secondary analysis may also be performed for other reasons, such as to verify the order of a sorted deck (e.g., the system may still require a sorted deck, but these secondary relationships may provide a way alert the operator that the deck was not sorted properly), verify a correct deck (e.g., 52 unique cards exist), and verify quality of the total scan (e.g., identify dirty cards).

Once the master images have been created and properly associated with the appropriate ranks and suits, the card recognition system 410 may be said to be "calibrated" as to the particular deck of cards. In a standard deck of cards, 18 master images may be stored: one master image for each rank (2-10, J, Q, K, A) and suit (diamond, heart, spade, club), as well as a master image for a joker. The master image for a joker may be stored as a rank. Other symbols may also be printed on the face of some of the cards. For example, a "Wagner" symbol is a special symbol printed on some of the cards for a deck that is used in certain card games in order to assist in game play. For example, a Wagner is typically useful during blackjack by being printed on the face of each card having a value of ten (i.e., each 10 rank, jack rank, queen rank, king rank) and eleven (i.e., each ace rank) to assist with the determination that the dealer has a "21." The Wagner symbol is often a polygon shape that is located between the rank and the top of the card. A master image for a "Wagner" symbol may be created and stored, while in some embodiments the Wagner symbol may simply be ignored by the card recognition processor 412. Other special symbols may also be treated similarly.

The master images may be stored as image files (e.g., bitmap files) in the subdirectory of the file system of the card recognition processor 412. The master images may further be loaded into the memory associated with the control logic 414 for comparison with the unknown images during card recognition mode. The master images may be separate files stored in the same subdirectory of the file system as the calibration file (e.g., a text file). In some embodiments, the calibration file may be combined in a file with the master images such that a single file may include image data and the calibration parameters.

During the card recognition mode, each time a card is moved past the card present sensor 430, the imaging device 416 may capture an unknown image of the card. The control logic 414 may compare the unknown image against the set of master images to determine the identity of the card. For example, the control logic 414 may compare the unknown image for the rank against each of the thirteen master images for the ranks (2-10, J, Q, K, A). The control logic 414 may also compare the unknown image for the suit against each of the four master images for the suits (diamond, heart, spade, club). Based on the results of these comparisons, the control logic 414 may determine the identity of the card by selecting the symbols with the highest degree of correlation. The control logic 414 may perform a plurality of processes that at least partially overlap in time. As a result, the unknown image may be compared with a plurality of different master images at the same time.

In one embodiment, the comparison may include comparing like pixels by performing an inverted XOR operation of the corresponding pixels of the unknown image and the master image. The result of the inverted XOR operation may be summed to obtain a score (e.g., a numeric sum). For example, a black pixel (1) compared with a black pixel (1) may add to the score, a white pixel (0) compared with a white pixel (0) may add to the score, while a black pixel (1) compared with a white pixel (0) may not add to the score. A larger score may indicate a greater number of matching pixels. The score may be represented as a raw number of pixels or as a percentage of the total number of pixels of the images. For example, a score of 100% may be a perfect pixel to pixel match of the unknown image and a master image. Of course, a perfect match may not be reasonable to expect, and a match may still be found for a score having a percentage less than 100%. As a result, a minimum threshold may be set for what the card recognition system 410 may consider a match. In some embodiments, the inverted XOR operation may be implemented as another logic operation. In some embodiments, like pixels may be added and dissimilar pixels may be not counted, while in other embodiments, dissimilar pixels may be added and then subtracted from the total number of pixels to determine the score.

In another embodiment, the comparison may include comparing cross correlation values of matrices from the master image and the unknown image. Such a cross correlation function may, however, require a larger amount of computational resources than embodiments that include a more simple summation.

The card recognition system 410 may generate either a valid card ID (if a match is determined) or an indication of an error (if a match is not determined). For example, the control logic 414 may return a score associated with the comparison of the unknown image with each master image. To obtain a "match," the score may be required to be above a minimum error threshold. In some situations, the scores for more than one master image may be above the minimum error threshold. The highest score, however, will be selected as the valid card ID. In other words, the master image used in the comparison that resulted the highest score may be selected as the card ID (assuming the score is above a minimum error threshold). A deck may also be flagged as being invalid if a pre-determined (e.g., 6) number of errors (e.g., misread cards) occur during card recognition. In some embodiments, the score may be based on the dissimilar pixels. Thus, a match would occur for the lowest score of dissimilarity (0% for a perfect match) above a maximum error threshold rather than being based on the score of similar pixels.

In some embodiments, the card recognition system 400 may display on a display device an image of the card from the imaging device 416 to be viewed by the operator during imaging. Such image displayed on the display device may be for verification that the valid card ID is the correct determination, or as a way to see that the card that produced an error indication.

Figure 5:
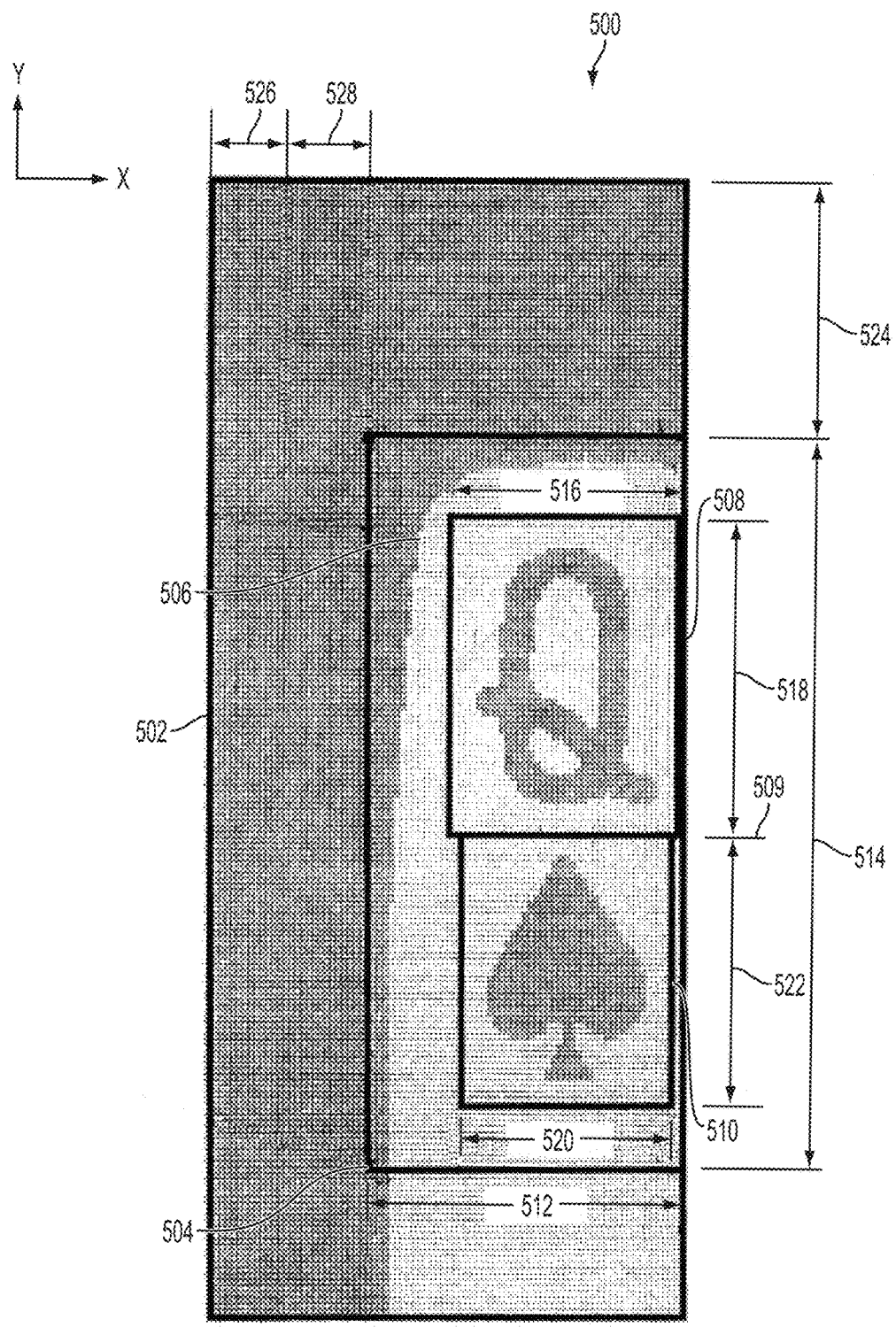
FIG. 5 is an illustration of an image captured by an imaging device of a card handling device, according to an embodiment of the present disclosure.

FIG. 5 is an illustration of an image 500 taken by an imaging device 416 (FIG. 4) of a card handling device, according to an embodiment of the present disclosure. The image 500 is taken from a field of view 502 for the imaging device. The field of view 502 of the imaging device defines what data is able to be captured by the imaging device 416 for the image 500. For example, the imaging device 416 may be located within the card handling device to capture at least a portion of a card 506 passing through the card handling device.

The image 500 may be a grayscale image having a resolution determined by the imaging device 416 (e.g., 320 pixel×240 pixel resolution). A grayscale pixel may have large number of different values, whereas a black and white pixel may have the value of either a 1 (black) or a 0 (white). When processing the image 500, the image 500 may be converted from a grayscale image to a black and white image. For example, the control logic 414 (FIG. 4) may employ a method to assign grayscale pixels below a certain threshold value to a 0 (white) and grayscale pixels above a certain value to a 1 (black). Of course, different resolutions and color schemes may be employed, as desired. For example, a full color image may be captured by the imaging device 416; however, it should be appreciated that lower resolution and black and white conversion may result in smaller file sizes and reduced processing time. It is contemplated, however, that the color (e.g., red or black) of the rank or suit may be one more distinguishing factor to assist in card recognition even though the color is treated as irrelevant in many of the examples described herein. Adding color analysis may increase the accuracy of identifying ranks and suits; however, it may come at the expense of additional complexity and/or processing time.

The field of view 502 further includes a region of interest 504. The region of interest 504 is the portion of the field of view 502 that includes the rank and suit of the card 506. In the example shown in FIG. 5, the rank is a queen (Q) and the suit is a spade located in the upper left-hand corner of the card 506. Of course, the rank and suit may be located in other positions on the face of the card 506.

Focusing the analysis of the card to the region of interest 504 may reduce the processing needed for finding a rank area 508 and a suit area 510. The rank area 508 and the suit area 510 may define an area around the rank and suit. The area may be a box, a rectangle, or other shape. The region of interest 504 should be large enough to completely contain each rank and suit symbol in the master set with some additional area added to account for variability in the acquired signal and variability in card position. Thus, the region of interest 504 may be located by measuring a size and location of each rank and suit box created by the system, and identifying an area in which every rank and suit symbol in the master set appears during the training and calibration phase. Because there may exist some variation in the location of the rank and suit symbols throughout the deck, the rank and suit boxes for the entire deck may be analyzed to determine a minimum number of pixels (in both X and Y directions) to consider to ensure that the rank and suit symbols fall within the region of interest 504. In some embodiments, the minimum number of pixels may be used, whereas in other embodiments some padding (i.e., extra pixels) may be added to allow for variations (e.g., card orientation) during actual use.

In some embodiments, the region of interest 504 may be determined by adding a fixed dimension in the X-direction from the right side of the image, while the dimension in the Y-direction may be determined by determining the furthest location from the top of the card 506 in the Y-direction to the bottom of the suit symbol. Because the rank and suit symbols may vary in location, the furthest location may be determined after analyzing the locations of all suits from the blob analysis. The final dimensions of the region of interest 504 may include some padding on these measurements in each direction to compensate for slight variations in card orientation during use. Other methods for defining the boundaries for the region of interest 504 are also contemplated such that the region of interest 504 has a suitable size and location to ensure that rank and suit symbols within the deck will be within the defined region of interest 504 even if the locations of the rank and suit symbols may vary somewhat.

When the measurements for the region of interest 504 are stored in the calibration file, the location and dimensions for the region of interest 504 may be fixed from one card image to the next when generating master images as well as for unknown images during card recognition.

A rank area 508 and a suit area 510 may be defined to surround the rank and suit, respectively. The rank area 508 has a rank width 516 and a rank depth 518, which may be measured in pixels. The suit area 510 has a suit width 520 and a suit depth 522, which may be measured in pixels. The rank area 508 and the suit area 510 may be separated at a split region 509. The split region 509 is a region (e.g., point, line, etc.) that is between the rank and the suit of the card 506, which may be used to be a starting point for measuring the rank area 508 and the suit area 510. In some embodiments, the split region 509 may be ignored by finding the rank and suit symbols, such as by blob analysis, and then applying the parameters from the calibration file if the calibration file exists. For tuning mode, the blob analysis may be used to automatically generate the calibration file.

As discussed above, during the tuning mode, the measurements of the rank area 508 and the suit area 510 may be automatically generated for each master symbol based on an image processing analysis of the image 500. In addition, the region of interest 504 measurements may be stored in the calibration file. As a result, the calibration file may also include the parameters that are used to generate master images for the rank and suit. During card recognition mode, the parameters stored in the calibration file for defining the measurements of the rank area 508 and the suit area 510 may be used to generate the unknown images. The unknown images may be compared with the master images for determining the identity of an unknown card passing through the card handling device. The rank area 508 and the suit area 510 may completely encompass the rank and the suit of the card 506. Having a good fit for the rank and suit may reduce the amount of white space in the rank area 508 and the suit area 510, which may provide a better separation and a more accurate match when comparing master images and unknown images.

As discussed above, various parameters may be stored in the calibration file in order to assist the generation of the master files during tuning mode and the generation of the unknown files during card recognition mode. These parameters may be determined by the card recognition processor 412 (FIG. 4) and stored in the calibration file. The calibration file may include the parameters for the specific card deck. Such parameters may include V_lines 512, H_lines 514, rank width 516, rank depth 518, suit width 520, suit depth 522, H_start 524, V_start 526, and V_offset 528. These parameters may be associated with various locations and measurements within the image 500.

V_start 526 is the shift in the X-axis for the finding the region of interest 504. V_start 526 may be based on the changes in the camera mount position relative to the calibration target. V_start 526 may be set internally by the control logic 414 or the card recognition processor 412. V_start 526 may be approximately the same for all shufflers of the same model, but may account for small changes in camera mount position between devices.

V_offset 528 is the pixel offset that is added along the X-axis to V_start 526 to find the edge of the region of interest 504. The region of interest 504 may be defined just beyond the edge of the card 506 (e.g., by a few pixels) into the dark background. The V_offset 528, which is a relative offset used to shift the card image further leftward into the region of interest 504. The V_offset 528 may be determined by checking across all card images that the region of interest 504 edge is just a few pixels away from the card next to each rank/suit image, as the card recognition processor 412 uses a black to white transition algorithm to find the edge of the card. In order to compensate for some rotation-caused shifting of the cards, the V_offset 528 may be reduced by a number (e.g., 4 pixels) from the minimal value found across all cards.

H_start 524 is a relative offset along the Y-axis that is used to shift the card image to define the upper portion of the region of interest 504. The higher the value of H_start 524, the greater the shift. H_start 524 corresponds to a shift of the region of interest 504 downward from the top of the card 506. H_start 524 may be determined by finding the distance to the black to white transition at the top edge of the card 506 and reducing by a number (e.g., 4 pixels) to compensate for some shifting in the cards.

V_lines 512 is the number of pixels in the region of interest 504 along the X-axis. In other words, the V_lines 512 is the width of the region of interest 504. V_lines 512 may be determined by taking the maximum of the centermost edge coordinate for the rank and suit across all cards, and then subtracting V_start 526 and V_offset 528.

H_lines 514 is the number of pixels in the region of interest 504 along the Y-axis. In other words, the H_lines is the depth of the region of interest 504. H_lines 514 may be calculated by determining the maximum coordinate across all card images for the edge closest to the bottom of the suit.

The point having the coordinates (V_start+V_offset, H_start) may be used to define the upper left-hand corner of the region of interest 504. The size of the region of interest 504 may be defined by the V_lines 512 and H_lines 514. As a result, a smaller window (i.e., the region of interest 504) may be output in order to look at a selected region within the field of view 502 during operation.

Additional parameters may be stored in the calibration file that relate to the operation of the imaging device. Such additional parameters may include exposure, camera gain, brightness, camera speed, camera resolution, etc., which may be read from registers of the imaging device 416.

Additional parameters may be stored in the calibration file that relate to the deck or the operation of the card recognition mode. Such additional parameters may include preload sets, split_algorithm_select, err_min_rank, err_min_suit, a deck number, and a library number.

Split_algorithm_select may be used to indicate the direction that the control logic 414 begins its scan for finding the split region 509 in the unknown image. For example, if there is a non-rank blob (e.g., Wagner symbol or artwork) between the rank and the top edge of the card 506, the split_algorithm_select may be set to 1 to instruct the control logic 414 to scan the region of interest 504 from bottom to top when finding the split region 509. The split_algorithm_select may be set to 0 to instruct the control logic 414 to scan the region of interest 504 from top to bottom when finding the split region 509.

Err_min_rank is a parameter used to identify unknown rank images. For example, if the score is less than the err_min_rank, the master rank image is reported as being a non-match to the unknown rank image. Err_min_suit is a parameter used to identify unknown suit images. For example, if the score is less than the err_min_suit, the suit image is reported as being a non-match. During a summing determination, a perfect match would have a 100% match rate between the unknown image and a master image. Because of some variations, this may not be the case. The err_min_rank and err_min_suit are may be set to have values equating to a desired error threshold (e.g., 75%) of the potential total matches in the summing determination. For example, if a rank area 508 or a suit area 510 has 32 pixels, the err_min_rank and the err_min_suit may be set to 24 (e.g., 24/32=0.75). As a result, if the percentage of pixel matches falls below this percentage (e.g., 75%), the rank and/or suit may be considered a non-match against the master image. If more than one master image provides a score that exceeds the match threshold (75%) when compared to the unknown image, then the master image having the highest score may be considered the matching symbol. If none of the master images provide a score that exceeds the match threshold (75%) when compared to the unknown image, then the unknown image may remain unknown and an error alert may be provided to the dealer. Situations in which the score may be below the match threshold may include an error in the tuning process, an error in the image capture of the unknown image, a card being turned over, a card being from another deck, a damaged or dirty card, the card handling device being dirty, etc.

The deck number may be a unique number associated with a particular calibration file in order for the dealer to select to be used in the future. The library number may represent the number of times that the calibration file has been updated. The preload sets parameter may represent a number of image shifts that are done during correlation for an image pair (e.g., an unknown image and a master image). In some embodiments, the deck number and library number may be stored in a separate deck name file that is different than the calibration file.

Figure 6:
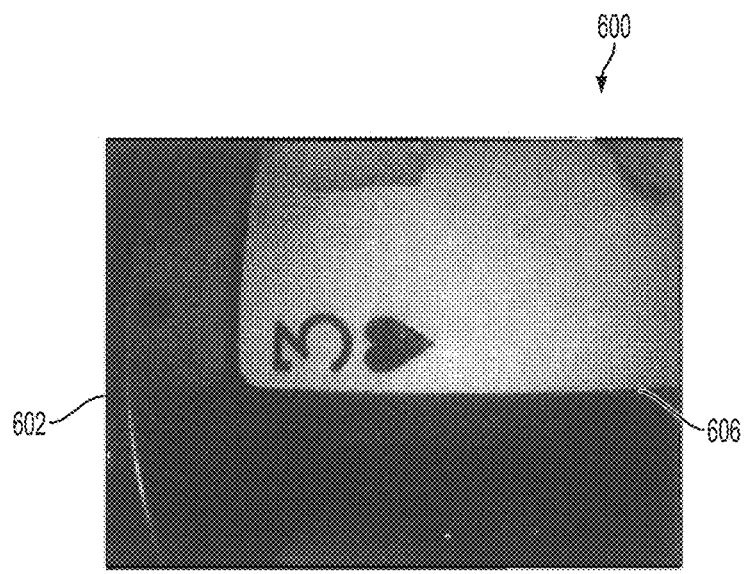
FIG. 6 is a raw image of a card showing the entire field of view for the imaging device.

FIG. 6 is a raw image 600 of a card 606 (three of hearts) showing the entire field of view 602 for the imaging device 416 (FIG. 4). The raw image 600 shown in FIG. 6 may be a grayscale image.

Figure 7A:
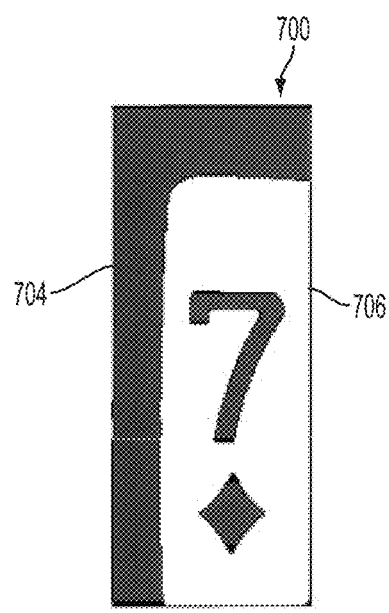
FIG. 7A is a processed image of a card resulting in a region of interest.

FIG. 7A is a processed image 700 of a card 706 (seven of diamonds) resulting in the region of interest 704. The processed image 700 shown in FIG. 7A may have been processed from a raw image. For example, the processed image 700 may be cropped to the region of interest 704, whereas the original raw image may have been for the entire field of view of the imaging device 416 (FIG. 4). In addition, the processed image 700 may be a black and white image, whereas the original raw image may have been a grayscale image or a color image.

Figure 7B:
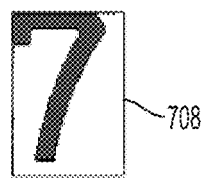
FIGS. 7B and 7C are images for a rank area and a suit area extracted from the region of interest.
Figure 7C:

FIGS. 7B and 7C are the images for the rank area 708 and the suit area 710 extracted from the region of interest 704 (FIG. 7A). The measurements of the rank area 708 and the suit area 710 may be determined during tuning mode and stored in the calibration file as discussed above. Also during tuning mode, the rank area 708 and the suit area 710 may be stored as the master images. During card recognition mode, the raw image may be an unknown image, and the rank area 708 and the suit area 710 may be the unknown images used for comparison of the master images. Although FIGS. 7B and 7C show the rank and suit to be shifted to the left and upper edges of the rank area 708 and the suit area 710, there may be some padding (i.e., white space) on each edge. In order to maintain a consistent location of the rank and suit in the images, the rank and suit may be shifted toward one of the corners as shown.

Figure 8A:
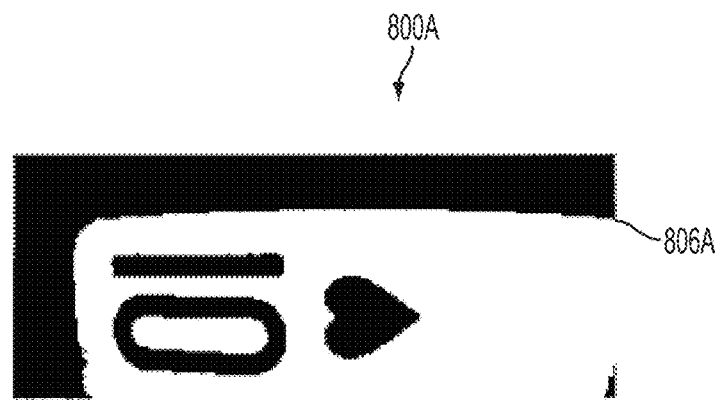
FIGS. 8A, 8B, and 8C show a processed image of a card, in which the imaging device had experienced dust build up on the lens.
Figure 8B:
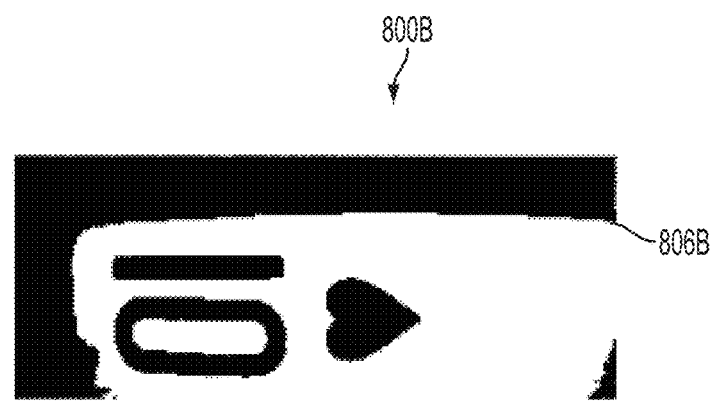
Figure 8C:
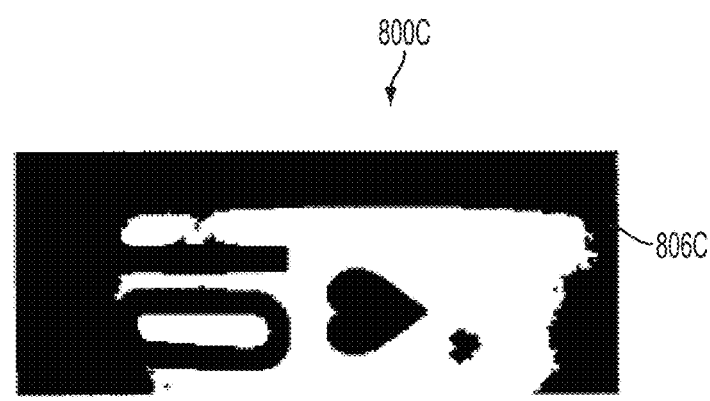

FIGS. 8A, 8B, and 8C show a processed image 800A, 800B, 800C of a card 806A, 806B, 806C, in which the imaging device 416 (FIG. 4) had experienced dust build up on the lens. Dust may accumulate on the lens over the lifetime of use of the card handling device. For example, FIG. 8A is an example of dust build up after a first number cycles, FIG. 8B is an example of dust build up after a greater number cycles, and FIG. 8C is an example of dust build up after many additional cycles.

When the imaging device 416 accumulates dust, the raw image may become a different shade of gray in terms of the grayscale image. The white area may become a little more gray and the black area may become a little less black. As discussed above, each pixel in a grayscale image has a value between white and black. When converting a grayscale image to a black and white image, a threshold value may be used as the cutoff point between black and white. As a result, the white area of the processed black and white image may become smaller as the camera accumulates dust.

The control logic 414 (FIG. 4) may be configured to correct for dust build up. In one embodiment, rather than setting a fixed threshold used to convert a grayscale image to a black and white image, the threshold value may be dynamically changed over time to compensate for dust build up. As an example, the threshold may change to have different levels over time. The threshold may be used to convert the grayscale image to a black and white image during the tuning mode. The threshold may be set to a first level during tuning mode, and to a second level during card recognition mode. As an example, the dynamic changes (from the first level to the second level) may be performed to compensate for changes in lighting conditions. It is also contemplated that the dynamic changes may be based on other conditions. In some embodiments, the number of cycles may be counted and the threshold may dynamically change with the number of cycles. In some embodiments, one or more data filters may be employed to further improve the processed image during conversion from grayscale to a black and white image.

Figure 9A:
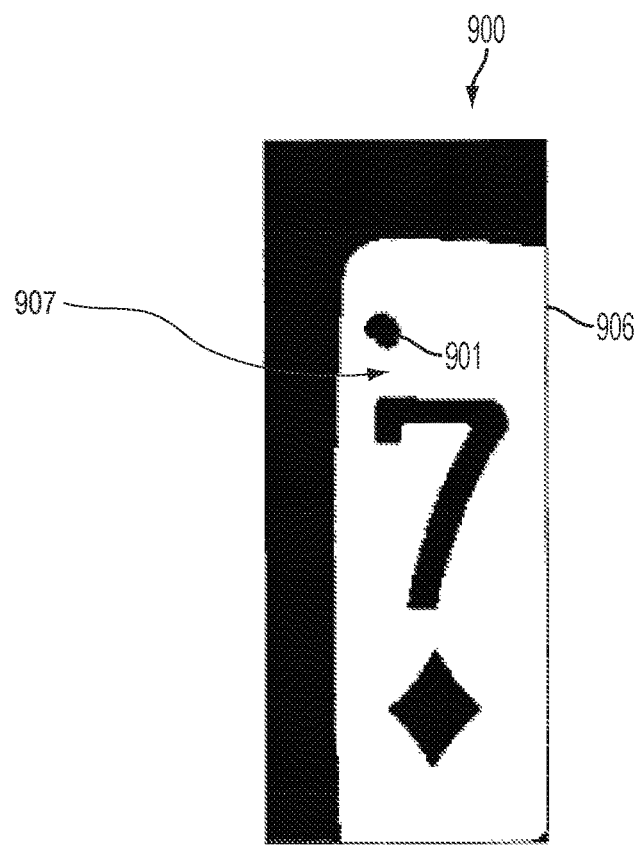
FIGS. 9A and 9B illustrate a problem of incorrectly splitting an image that may arise during card recognition mode.
Figure 9B:
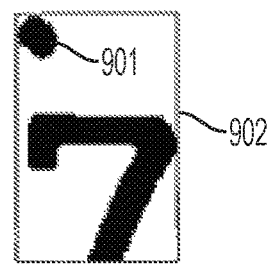

FIGS. 9A and 9B illustrate a problem of incorrectly splitting an image that may arise during card recognition mode. In particular, incorrectly splitting an image may often occur when the imaging device 416 (FIG. 4) is not clean or if the actual card itself has a mark. As a result, a blemish 901 may appear on the image 900 that is used to obtain the rank area and the suit area for the card 906. The blemish 901 may be mistaken for either the rank or suit, often because the control logic 414 may first look for the split between the rank and suit as a starting point. As shown in FIG. 9, the control logic 414 may mistake the space 907 between the blemish 901 and the rank as the split point. As a result, the control logic 414 may generate a box 902 as either the rank area or the suit area, but which does not include the proper portion of the image 900. Correcting for dust build up may result in fewer errors in splitting the image.

In some embodiments, the control logic 414 may not create the unknown images based on finding a split between the rank and suit symbols. Rather, the control logic 414 may compare the master images to the unknown image generated from the entire field of view of the imaging device 416 during card recognition mode. In other words, the entire field of view (or a portion thereof) may be used as the unknown image, which may be larger than the master image. In such an embodiment, the control logic 414 may perform a plurality of comparisons of each master image and the unknown image by scanning the master image in the region of interest. For example, the master image may begin this comparison in the top left corner of the unknown image and scan across pixel by pixel to the top right corner. The master image may then be moved down a row of pixels moving along the pixels of that row, and so on. If at some point during this scanning, a score results in a match, the card may be identified.

Figure 10A:
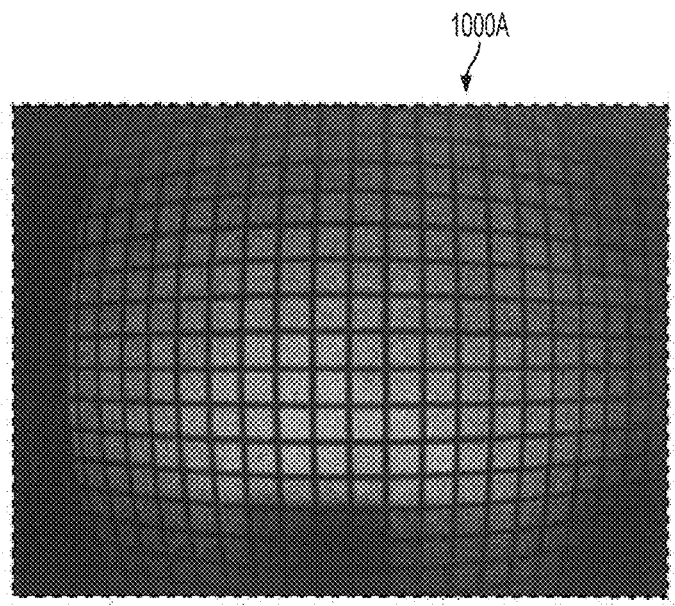
FIGS. 10A, and 10B illustrate an issue that may arise when capturing an image using uneven illumination.
Figure 10B:
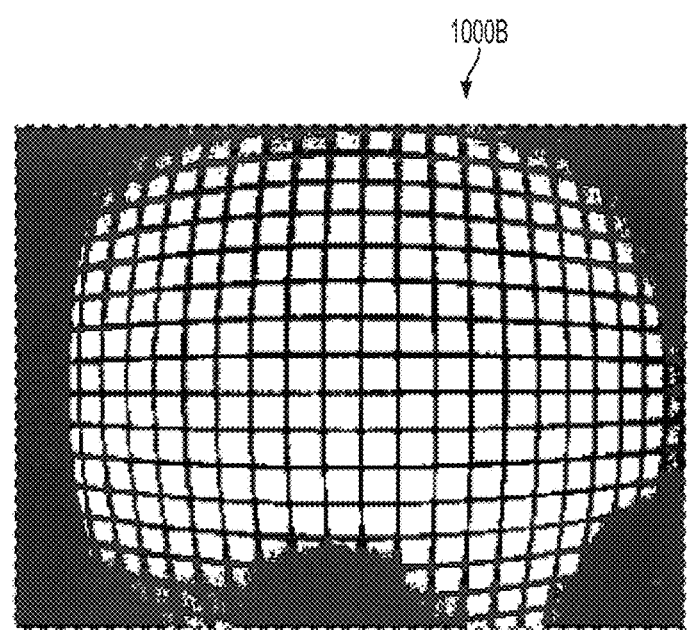

FIGS. 10A, and 10B illustrate an issue that may arise when capturing an image using uneven illumination and fisheye distortion. FIG. 10A is a raw image 1000A using a grid for illustration. FIG. 10B is a processed image 1000B showing the grid after conversion from grayscale to black and white. As shown in FIGS. 10A and 10B, uneven lighting may cause some portions of the raw image 1000A to appear dark when they are actually white. As a result, recognition may not be as accurate due to a lower score when comparing images, or for more serious problems such as incorrect splitting (FIGS. 9A, 9B).

Uneven illumination may be corrected in a similar manner to the correction for dust build up on the imaging device 416 (FIG. 4). For example, the control logic 414 may be configured to dynamically change the threshold value used in the conversion from the grayscale image to the black and white image. The dynamic change may be responsive to a number of cycles of the imaging device, a light sensor detecting illumination changes, or other changes in the environment. In some embodiments, one or more data filters may be employed to further improve the processed image during conversion from grayscale to a black and white image.

Figure 11A:
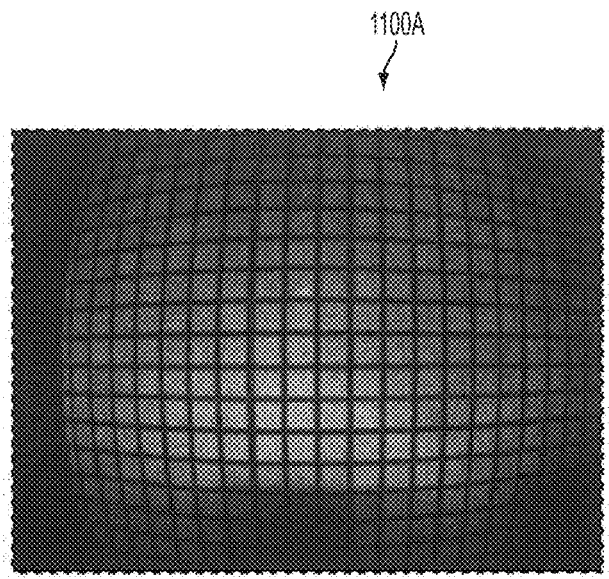
FIGS. 11A, 11B, and 11C are raw images from the imaging device of a card handling device showing fish eye distortion caused by the imaging device.
Figure 11B:
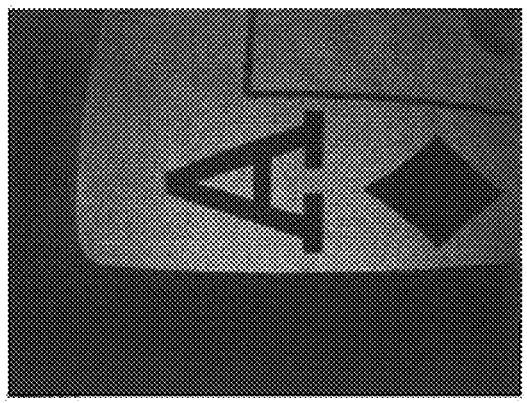
Figure 11C:
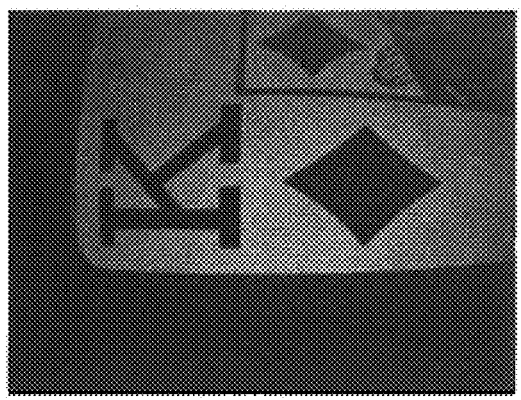

FIGS. 11A, 11B, and 11C are raw images from the imaging device 416 (FIG. 4) of a card handling device showing fish eye distortion caused by the imaging device 416. In some embodiments, the small measurements within the card handling device and proximity of the imaging device to the card may require a fisheye lens to be used with the imaging device. The fisheye lens may provide a wide field of view for the imaging device that is sufficient to view the rank and suit for different types of cards. For example, some decks may have relatively large ranks and suits that take up a large area of the corner of the card. In addition, the location of the rank and suit may vary from one deck to another.

The fisheye lens may introduce fisheye distortion in the raw images taken by the imaging device. For example, FIG. 11A shows a raw image 1100A of a grid in which the squares of the grid are equal sizes. However, as shown in FIG. 11A, the fisheye distortion causes the squares of the grid to appear to be different sizes throughout the raw image 1100A. Near the center of the raw image 1100A, the fisheye distortion may not be as pronounced; however, near the edges and corners of the raw image 1100A, the fisheye distortion becomes more pronounced.

FIGS. 11B and 11C are raw images 1100B, 1100C taken with an imaging device with a lens having fisheye distortion. When comparing the diamond suits in FIGS. 11B and 11C, it can be seen that the shapes of the diamond vary because of the different placement of the diamond ranks within the field of view of the imaging device. For example, the diamond suit in FIG. 11B is smaller than the diamond suit in FIG. 11C because it is located further from the center of the field of view. In addition, the ace (A) rank in FIG. 11B is mostly centered within the field of view. The king (K) rank in FIG. 11C, however, is off-center and is smaller near the top of the rank compared with the bottom of the rank. As a result, the more distortion experienced by the ranks and suits in an image, the greater the effect the distortion may have for the score from the comparison with the master images for the ranks for determining the card ID. In some situations, fisheye distortion has caused a misidentification of the card ID (e.g., the suit is identified as a spade when the suit was really a diamond).

The card recognition system 410 (FIG. 4) may be configured to correct for such fisheye distortion. In other words, the fisheye distortion may be reduced, such as by stretching the distorted image. In some embodiments, the image pixels may be translated from the raw image to a corrected raw image according to a correction table (i.e., look-up table). In some embodiments, the image pixels may be mathematically translated from the raw image to a corrected raw image.

FIGS. 12A, 12B, and 12C are images 1200A, 1200B, 1200C for which the fisheye distortion has been reduced through mathematical stretching of the distorted image. As shown in FIG. 12A, the grid (which was distorted in FIG. 11A) has squares that are now substantially the same size. In FIG. 12B, the diamond suit (which was distorted in FIG. 11B) is now substantially symmetrical even though the diamond suit is off-center and proximate the edge of the image. In FIG. 12C, each of the king rank (K) and the diamond suit (which were distorted in FIG. 11C) are no longer distorted.

Figure 13:
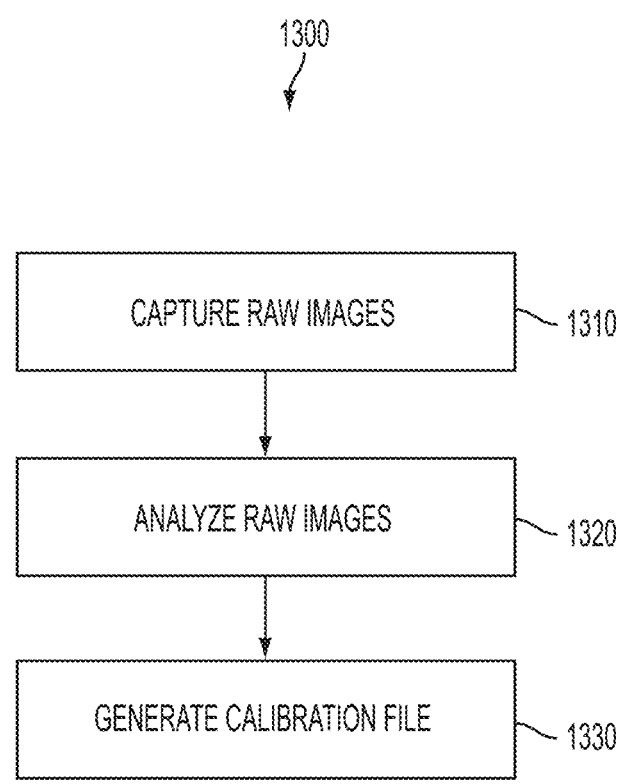
FIG. 13 is a flowchart illustrating a method for automatically generating a calibration file for a card detection system according to an embodiment of the present disclosure.

FIG. 13 is a flowchart 1300 illustrating a method for automatically generating a calibration file for a card detection system according to an embodiment of the present disclosure. The calibration file may be generated for a deck of cards selected by an operator prior to the card handling device being set up on location. In some embodiments, an operator (e.g., technician, dealer, pit boss, etc.) may be permitted to initiate the generation of the calibration file on location on an as-needed basis. One benefit of generating the calibration file on location may be that the parameters for the calibration file may be determined for the actual deck that is used (rather than just the same type of deck), for the actual imaging device, and under the actual lighting conditions. The operator may also select a name for the deck of cards so that the deck of cards may be used later without the need to retrain the card recognition system for that particular deck. Rather, the operator may select the deck for which a calibration file and master images have already been generated. Conversely, the operator may select a calibration file that was automatically generated in a previous training event when planning to use the same card type.

At operation 1310, raw images for the cards in the deck may be captured. For example, the deck of cards may be inserted into a card handling device with each card being read into the card recognition system of the card handling device. An imaging device may capture a raw image for each card of the deck. As discussed above, the deck may be pre-sorted as desired; however, in some embodiments, the deck may be in any order for capturing the raw images of each card. As a result, the operator may not need to manually sort the cards in the deck prior to inserting the deck into the card handling device, which may reduce time and errors in calibrating the card recognition system. In some embodiments, a new set of cards may be read in original deck order to calibrate the card recognition system.

At operation 1320, the raw images may be analyzed to determine the parameters (e.g., measurements of rank and suit areas, etc.) to be stored in the calibrate file. For example, a card recognition processor may be configured to perform an image processing analysis that automatically identifies a location and/or measurements for the rank and suit of at least one card. As an example, the card recognition processor may perform a blob analysis on one or more of the raw images stored in the memory. As discussed above, the blob analysis may be employed to locate rank and suit symbols, and distinguish between ranks, suits, and other markings on the card. Once the blobs are identified for the rank and suit of the card in the raw images, the measurements may be determined to define an area around each of the rank and the suit. In some embodiments, the 10 rank may be used as the particular rank to first identify the location and measurements of the rank area for the reasons discussed above. In some embodiments, the suit may be the large blob located below the rank, which may make identifying the location and measurements of the suit area relatively easy after locating the 10 rank.

In some embodiments, the location and measurements of the suit may be identified prior to the rank. For example, the suit may be identified by comparing portions of the raw image against a generic xml file describing suit curvatures, being immune to scale or rotation, for portions of the raw image that are closest to the corner of the card. In some embodiments, the rank may be the large blob located above the suit, which may make identifying the location and measurements of the rank area relatively easy after locating the appropriate suit.

Each of the raw images may be analyzed and the maximum and minimum measurements for the ranks and suits across the entire deck may be determined. The final measurements for the rank area and the suit area that are stored in the calibration file may be determined by taking the maximum measurements and then expanding values slightly to allow for some white space around the ranks and suits. Expanding the maximum value of the ranks and suits in this manner may allow for slight variations in print size, as well as for rotation of cards that may exist when reading in the cards.

At operation 1330, a calibration file may be generated and the parameters may be stored therein. The parameters may include the rank height, rank width, suit height, suit width, a location of an area of interest, as well as other desired parameters, such as those discussed above with respect to FIG. 5. The calibration file may be stored in memory within a card recognition processor, the control logic that performs the comparison of the unknown images and the master images, or both. Storing the calibration file in memory of the card recognition processor may include storing the calibration file in a subdirectory associated with the particular deck or deck type that is being tuned. The calibration file may further include other parameters that may be used by the control logic in generating master images, cropping unknown images, or for other reasons as discussed above.

Figure 14:
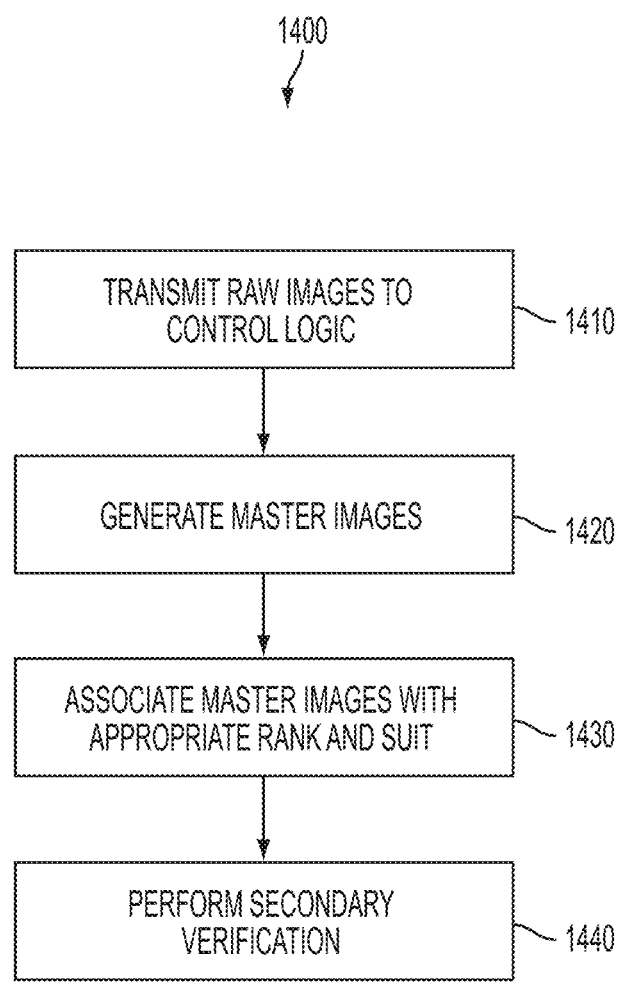
FIG. 14 is a flowchart illustrating a method for generating master images according to an embodiment of the present disclosure.

FIG. 14 is a flowchart 1400 illustrating a method for generating master images according to an embodiment of the present disclosure. For the flowchart 1400, it is presumed that a calibration file has already been created, such as by the method of FIG. 13, or other methods described herein. For example, the calibration file may be automatically created using image processing methods to locate rank and suit symbols in the raw images and determine parameters regarding measurements of the rank and suit symbols. These parameters, along with other parameters discussed above, may be included with the calibration file that may be stored in a subdirectory of a file system. In addition, it may also be presumed that the raw images for the deck may have been stored in the memory device 418 (FIG. 4), which raw images may have been used in the analysis for automatically generating the calibration file.

At operation 1410, each raw image stored in the memory device 418 may be transmitted to the control logic 414 (FIG. 4). The raw images may be of the complete field of view of the imaging device 416 (FIG. 4) when a card was in a position to be read.

At operation 1420, the control logic 414 may generate the master images. In particular, the control logic 414 may crop the raw images according to the parameters stored in the calibration file. For example, the control logic 414 may crop the raw images according to stored rank area and suit area measurements to generate separate master images for the rank and the suit of the card. In some embodiments, a single master image may be generated for each card that includes both the rank and the suit (essentially the region of interest). Doing so, however, may require 52 master images (one for each card) rather than having as few as 17 master images (one for each rank and one for each suit), which may change the processing time during the card recognition mode.

At operation 1430, the master images may be associated with the appropriate rank and suit. In some embodiments, the order of each card in the deck may be known when master images are generated because deck may be pre-sorted when raw images are captured. As a result, each master image may be assigned a rank or suit based on the expected order of the pre-sorted deck. In other embodiments, the deck may not be required to be in any particular order. The card recognition processor 412 may perform analysis as described above, such as comparing master images against each other to determine secondary relationships between master images. In some embodiments, where the raw images may be stored in memory device 418 in a pre-determined order according to a sorted deck, the rank and suits may simply be known as being assigned according to the expected order of the cards being read in. If, however, the cards were not actually in the expected order, errors may occur. As a result, additional verification of this association may be desired to reduce such errors.

At operation 1440, secondary verification may be performed to determine whether the tuning process was correct. One example may include comparing master images with each other to determine secondary relationships. This may be done regardless of whether the deck should have been pre-sorted or not. For example, such secondary relationships may identify associations that may be incorrect because of a card that was out of order. Another secondary verification may be to check to see if the 10 ranks are in the correct location if a pre-sorted deck is being used. Additional levels of relationships (e.g., tertiary) between master images may also be analyzed for verification that the tuning process was accurate. Another secondary verification may be to display the master image and what the card recognition system determined the association to be. The operator may be allowed to select whether the association is correct and to make any changes if incorrect.

Figure 15:
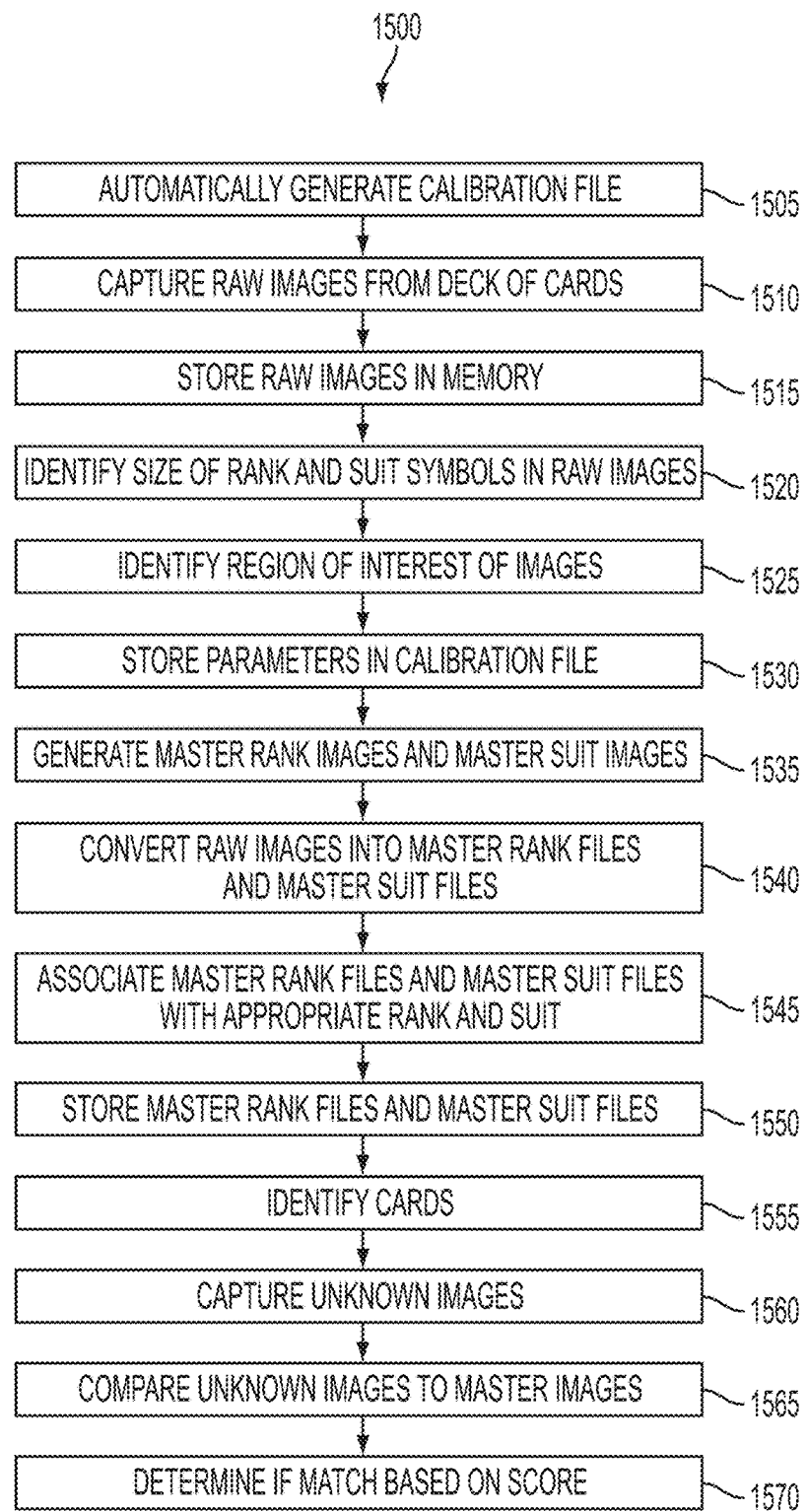
FIG. 15 is a flowchart illustrating a method for identifying a card rank and suit according to an embodiment of the present disclosure.

FIG. 15 is a flowchart 1500 illustrating a method for identifying a card rank and suit according to an embodiment of the present disclosure. At operation 1505, a calibration file may be generated by one or more of the following. At operation 1510, raw images may be captured from a deck of cards that is inserted into a card handling device. In some embodiments, the deck of cards may be sorted according to a predetermined order, while in other embodiments, the deck of cards may be in an order that is not predetermined. At operation 1515, the raw images may be stored in memory. At operation 1520, the size and the rank and suit symbols may be identified in the raw images. For example, a card recognition processor may perform a blob analysis to identify the location of the rank and suit symbols from among a plurality of blobs detected by the blob analysis. The blob analysis may ignore other blobs based on size, shape, or location in order to arrive at the rank and suit symbols. The blob analysis may also measure the size (e.g., height and width) of each of the rank and suit symbols. At operation 1525, a region of interest may be identified. The region of interest may be identified based on a maximum height and width for all of the rank and suit symbols as well as their locations to arrive at an area that may fully encompass each of the ranks and suits symbols of each card, which themselves may vary from card to card. At operation 1530, the parameters may be stored in the automatically generated calibration file. Parameters may include measurements for the rank box and the suit box and the measurements and coordinates for the region of interest, as well as additional parameters previously discussed.

At operation 1535, master rank images and master suit images may be generated by one or more of the following. At operation 1540, the raw images may be converted into master rank files and master suit files. For example, the calibration file may be used to crop the raw file around the rank symbol and the suit symbol in the raw images. In some embodiments, the master images and the calibration file may be created during operations that may overlap in time. At operation 1545, the master rank files and the master suit files may be associated with the appropriate rank and suit. For a deck that is arranged in a known order, these associations may be based on the expected order of the deck. For a deck of an unknown order, these associations may be based on indirect association that may be inferred by secondary analysis between master images, such as checking scores of next best matches and other similar relationships. At operation 1550, the master rank files and master suit files may be stored in a file system of the card recognition processor, in control logic, or both.

At operation 1555, cards may be identified during run mode by one or more of the following. At operation 1560, unknown images may be captured. For example, unknown images may be captured during game play to verify hands, at the beginning of game play to verify a deck, etc. At operation 1565, the unknown images may be compared to the master images. The comparison may be based on comparing pixel to pixel of each file to generate a score. The score may be represented as a number of pixels, a percentage of pixels, or other suitable form. In another embodiment, each master image may be scanned across a larger unknown image to determine a plurality of scores that may be used to determine if a match exists. At operation 1570, a match may be determined based on the score. The match and score may be determined based on meeting a threshold for either an appropriate measure of similarities or dissimilarities.

CONCLUSION

In an embodiment, a card recognition system comprises an imaging device configured to capture a raw image of at least a portion of a card, and a processor operably coupled with the imaging device. The processor is configured to perform an image processing analysis of the raw image identifying measurements of at least one of a rank area around a rank of the card, and a suit area around a suit of the card, and automatically generate a calibration file based, at least in part, on the image processing analysis.

In another embodiment, a card handling device comprises a card infeed, a card output, and a card recognition system. The card recognition system includes an image sensor configured to capture an image of a card passing from the card infeed to the card output, and a card recognition processor. The card recognition processor is configured to automatically generate a calibration file using an image analysis process of the image. The calibration file includes measurements for at least one of a size of a rank and a suit of the card within the image.

In another embodiment a method for tuning a card handling device is disclosed. The method comprises capturing a plurality of images from a deck of cards, storing the images in memory, analyzing the plurality of images for card identification information, and generating a calibration file including parameters associated with the card identification information based on the analyzing.

In another embodiment, a method of automatically generating a calibration file for identifying a specific card type is disclosed. The method comprises capturing a plurality of raw images from a deck of cards, storing the plurality of raw images in memory, identifying a size of each rank and suit symbol of each stored raw image of the plurality, storing a region of interest and symbol size information in a calibration file for the plurality of raw images, converting a plurality of raw images into a plurality of master rank files and a plurality of master suit files, and storing the plurality of master rank files and the plurality of master suit files corresponding to a specific card type.

In another embodiment, a method of identifying a card rank and suit is disclosed. The method comprises automatically creating a calibration file by capturing a plurality of raw images from a deck of cards, storing the plurality of raw images in memory, identifying a size of each rank and suit symbol of each stored raw image of the plurality, and storing a region of interest and rank and suit symbol size information in the calibration file for the plurality of raw images. The method further comprises generating a plurality of master rank files and a plurality of master suit files by converting a plurality of raw images into a plurality of master rank files and a plurality of master suit files, and storing the plurality of master rank files and the plurality of master suit files corresponding to a specific card type.

While certain illustrative embodiments have been described in connection with the figures, those of ordinary skill in the art will recognize and appreciate that embodiments of the disclosure are not limited to those embodiments explicitly shown and described herein. Rather, many additions, deletions, and modifications to the embodiments described herein may be made without departing from the scope of embodiments of the invention as hereinafter claimed, including legal equivalents. In addition, features from one embodiment may be combined with features of another embodiment while still being encompassed within the scope of the invention as contemplated by the inventor.

What is claimed is:

1. A method for operating a card handling device, the method comprising:
   capturing images from a set of cards with an imaging device of a card handling device as the cards pass through the card handling device during a calibration mode;
   storing the images of the cards in a non-transitory memory of the card handling device;
   automatically generating a calibration file during the calibration mode with a processor of the card handling device, and storing the calibration file in the non-transitory memory, wherein the calibration file includes parameters responsive to the processor analyzing each image of the images for card identification information related to at least one of a rank area or a suit area of the card in the respective image; and
   retrieving the parameters from the calibration file during a card recognition mode of the card handling device to determine an identity of at least one card passing through the card handling device during operation thereof.

2. The method of claim 1, further comprising automatically generating, with the processor, master images from the images based on the parameters in the calibration file during the calibration mode, and storing the master images in the non-transitory memory.

3. The method of claim 2, further comprising automatically associating, with the processor, the master images with an appropriate rank and suit during the calibration mode.

4. The method of claim 2, wherein determining the identity of at least one card passing through the card handling device includes:
   capturing, with the imaging device, at least one unknown image as a card passes through the card handling device;
   comparing, with the processor, at least a portion of the at least one unknown image to one of the master images; and
   determining, with the processor, a match of a card identity based on a score from the comparing.

5. The method of claim 3, further comprising comparing, with the processor, master images of the master images with each other to determine secondary relationships during the calibration mode.

6. The method of claim 5, wherein comparing master images of the master images with each other is performed as part of a secondary verification after associating the images with an appropriate rank and suit of cards from the set of cards is performed from a pre-sorted deck.

7. The method of claim 1, wherein determining the identity of at least one card passing through the card handling device occurs during game play to verify hands of cards dealt by the card handling device.

8. The method of claim 1, wherein determining the identity of at least one card passing through the card handling device occurs outside of game play to verify contents of a deck of cards.

9. The method of claim 1, wherein analyzing each image of the images for card identification information related to at least one of a rank area or a suit area of the card in the respective image includes locating blobs in the images and identifying a centroid and a location of the blobs.

10. A card handling device, comprising:
    an imaging device configured to capture images from a set of cards as the cards pass through the card handling device during a calibration mode;
    a non-transitory memory operably coupled with the imaging device and configured to store the images of the cards captured by the imaging device;
    a processor operably coupled with the imaging device and the non-transitory memory, the processor configured to control operation of the card handling device during both a card calibration mode and a card recognition mode, including to:
      automatically generate a calibration file during a calibration mode of the processor by analyzing each image of the images for card identification information related to at least one of a rank area or a suit area of the card in the respective image;
      cause the calibration file to be stored in the non-transitory memory; and
      retrieve the parameters from the calibration file during a card recognition mode of the card handling device to determine an identity of at least one card passing through the card handling device during operation thereof.

11. The card handling device of claim 10, wherein the processor is further configured to:

automatically generate master rank images and master suit images from the images based on the parameters in the calibration file during the calibration mode; and cause the master images to be stored in the non-transitory memory.

12. The card handling device of claim 11, wherein the processor is further configured to run an operating system having a file system organized in subdirectories for each deck type to which the card handling device has been tuned during calibration mode.

13. The card handling device of claim 11, wherein the processor is further configured to automatically associate the master rank images and the master suit images with their corresponding rank and suit according to a predetermined order in which the cards are read in by the imaging device using a sorted deck during the calibration mode.

14. The card handling device of claim 11, wherein the processor is further configured to automatically associate the master rank images and the master suit images with their corresponding rank and suit by assigning a rank to each master rank file or a suit to each master suit file according to an order that the corresponding master image was saved in the non-transitory memory.

15. The card handling device of claim 11, wherein the processor is further configured to automatically associate the master rank images and the master suit images with their corresponding rank and suit by assigning a rank to each master rank or a suit to each master suit image from a direct association based on an expected identity by the processor.

16. The card handling device of claim 11, wherein the processor is further configured to automatically associate the master rank images and the master suit images with their corresponding rank and suit according to an unknown order in which the cards are read in by the imaging device using an unsorted deck during the calibration mode.

17. The card handling device of claim 11, wherein the processor is further configured to automatically associate the master rank images and the master suit images with their corresponding rank and suit by assigning a rank to each master rank or a suit to each master suit image from an indirect association from other master images.

18. The card handling device of claim 11, wherein the processor is further configured to convert the raw images from a grayscale image to a black and white image based on a threshold level that dynamically changes over time responsive to a change in lighting conditions.

19. The card handling device of claim 12, wherein each subdirectory includes the respective calibration file and the master images automatically generated by the processor during the calibration mode.

20. The card handling device of claim 10, further comprising a shuffle processor separate from the processor, the shuffle processor configured to control components that move the cards through the card handling device.

* * * * *